United States Patent [19]

Zhou et al.

[11] Patent Number: 5,995,511
[45] Date of Patent: Nov. 30, 1999

[54] DIGITAL NETWORK INCLUDING MECHANISM FOR GROUPING VIRTUAL MESSAGE TRANSFER PATHS HAVING SIMILAR TRANSFER SERVICE RATES TO FACILITATE EFFICIENT SCHEDULING OF TRANSFERS THEREOVER

[75] Inventors: Fan Zhou; Robert J. Brownhill, both of Cranberry Township; Jon C.R. Bennett, Neville Island, all of Pa.; Mahesh N. Ganmukhi, Carlisle, Mass.

[73] Assignee: FORE Systems, Inc., Warrendale, Pa.

[21] Appl. No.: 08/628,206

[22] Filed: Apr. 5, 1996

[51] Int. Cl.[6] ........................................................ H04J 3/02
[52] U.S. Cl. ........................ 370/412; 370/391; 370/400; 370/438
[58] Field of Search .................................... 370/400, 407, 370/411, 412, 438, 351, 391, 396, 517

[56] References Cited

U.S. PATENT DOCUMENTS

| | | | |
|---|---|---|---|
| 4,375,097 | 2/1983 | Ulug | 370/400 |
| 5,487,061 | 1/1996 | Bray | 370/412 |
| 5,526,344 | 6/1996 | Diaz et al. | 370/438 |
| 5,533,020 | 7/1996 | Byrn et al. | 370/412 |

*Primary Examiner*—Douglas W. Olms
*Assistant Examiner*—Shick Hom
*Attorney, Agent, or Firm*—Ansel M. Schwartz

[57] ABSTRACT

A queue control system is disclosed for use in connection with the transfer of information, in the form of information transfer units, in a digital network. The network provides a plurality of service rate classes, based on, for example transmission rates for the various paths. The information buffer control subsystem includes a information transfer unit receiver, a information transfer unit buffer and a group controller. The information transfer unit receiver receives the information transfer units, and the buffer is provided to buffer the received information transfer units prior to transmission. The group controller controls the buffering of information transfer units received by the information transfer unit receiver in the buffer. In that operation, the group controller aggregates the information transfer units for each path in the buffer according to respective service rate classes, in particular aggregating the information transfer units for each path in a queue and further aggregating the queues for the paths associated with each service rate class in a queue. A transmission scheduler is also disclosed for use in transferring information, in the form of information transfer units, each associated with a path, in a digital network. The network provides a plurality of service rate classes, based on, for example, transmission rates for the various paths. The information transfer units for each path in a path queue, and the path queues for the paths associated with each service rate class are aggregated in a service rate queue. The transmission scheduler includes a information transfer unit selector for selecting from among the service rate queues, one path queue to provide a information transfer unit for transmission, and a information transfer unit transmitter for transmitting the information transfer unit provided by the selected path queue.

56 Claims, 13 Drawing Sheets

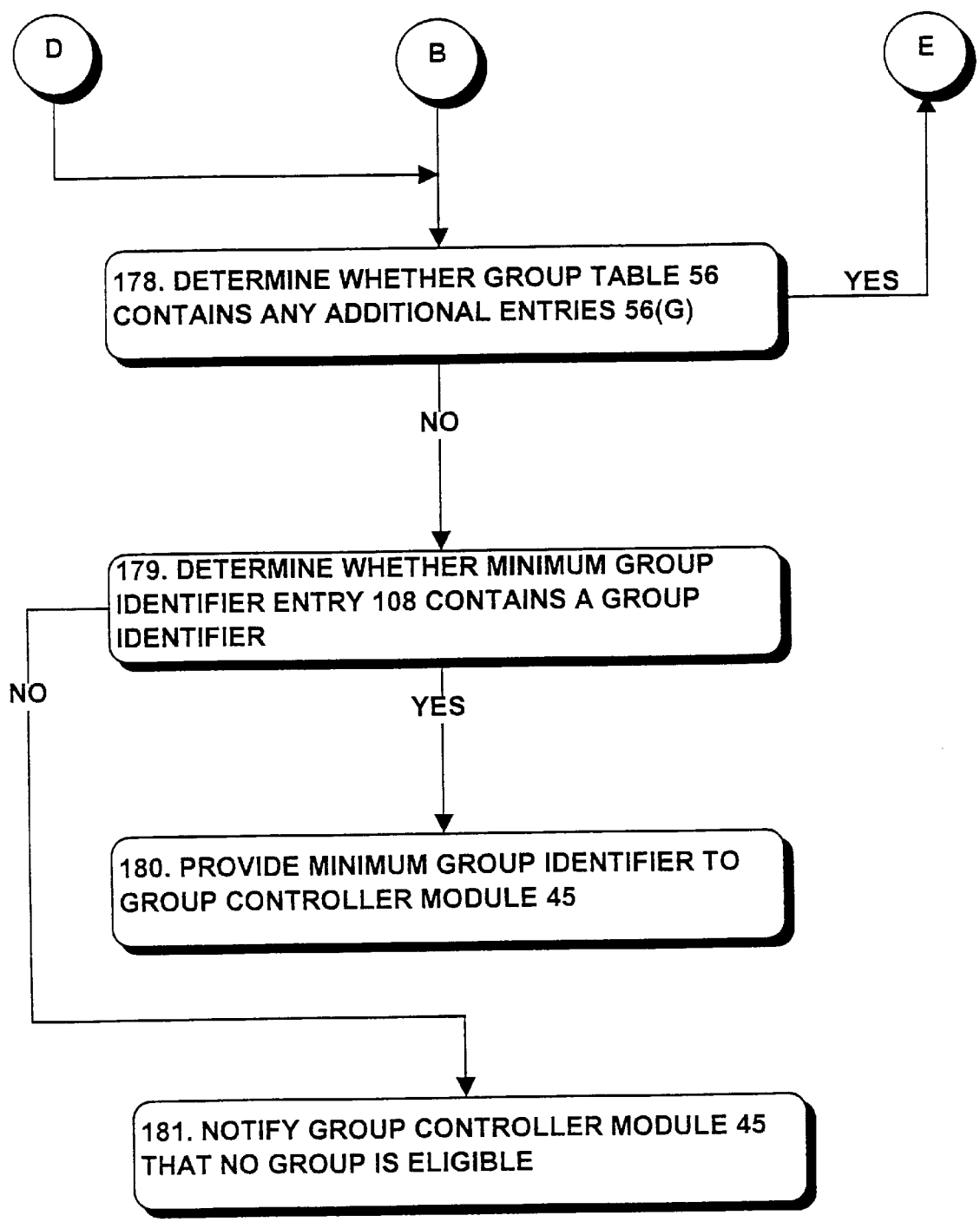

DIGITAL NETWORK INCLUDING MECHANISM FOR GROUPING VIRTUAL MESSAGE TRANSFER PATHS HAVING SIMILAR TRANSFER SERVICE RATES TO FACILITATE EFFICIENT SCHEDULING OF TRANSFERS THEREOVER

FIELD OF THE INVENTION

The invention relates generally to the field of digital communications systems and more particularly to digital networks for facilitating communication of digital data in, for example, digital image, audio and video distribution systems and among digital computer systems. The invention is more particularly directed to a digital network in which message transfer paths may be provided with various classes of transfer service, and provides a mechanism for grouping message transfer paths having similar transfer service rates to facilitate efficient scheduling of transfers thereover.

BACKGROUND OF THE INVENTION

Digital networks have been developed to facilitate the transfer of information, including data and programs, among digital computer systems and other digital devices. A variety of types of networks have been developed and implemented using diverse information transfer methodologies. In some networks, such as the well-known Ethernet, a single wire is used to interconnect all of the devices connected to the network. While this simplifies wiring of the network in a facility and connection of the devices to the network, it results in generally slow information transfer, since the wire can only carry information, in the form of messages, from a single device at a time. To alleviate this to some extent, in some Ethernet installations, the network is divided into a number of sub-networks, each having a separate wire, with interfaces interconnecting the wires. In such installations, wires can carry messages for devices connected thereto simultaneously, which increases the number of messages that can be transferred simultaneously. It is only when a device connected to one wire needs to send a message to a device connected to another wire that wires in two or more sub-networks will be used, making them unavailable for use by other devices connected thereto.

To alleviate this, networks have been developed in which communications are handled through a mesh of switching nodes. The computer systems and other devices are connected to various ones of the switching nodes to, as information sources, provide information for transfer over the network and/or, as destinations, for receiving information from the network, with the information that is transferred being transferred over selected paths of switching nodes comprising the network. In various types of networks, including networks in which information is transferred using the well-known "ATM" ("Asynchronous Transfer Mode") transfer methodology, various information transfer paths through the network between respective sources and destinations can be assigned classes of guaranteed transfer services, such as guaranteed rates at which information can be transferred over the respective paths in the network. A problem arises, however, in that the switching nodes in the network need to be able to efficiently ensure that information to be transferred over the paths with the guaranteed service rates is transferred in accordance with those guaranteed rates, and in addition to provide that they will also be able to transfer information over paths for which no guaranteed service rates are provided.

SUMMARY OF THE INVENTION

The invention provides a new and improved digital network in which message transfer paths may be provided with a plurality of transfer service rates, the network including a mechanism for grouping message transfer paths having similar transfer service rates to facilitate efficient scheduling of transfers thereover.

In brief summary, in one aspect the invention provides a queue control system for use in connection with the transfer of information, in the form of cells, in a digital network. The network provides a plurality of service rate classes, based on, for example transmission rates for the various paths. The information buffer control subsystem includes a cell receiver, a cell buffer and a group controller. The cell receiver receives the cells, and the buffer is provided to buffer the received cells prior to transmission. The group controller controls the buffering of cells received by the cell receiver in the buffer. In that operation, the group controller aggregates the cells for each path in the buffer according to respective service rate classes, in particular aggregating the cells for each path in a queue and further aggregating the queues for the paths associated with each service rate class in a queue.

In another aspect, the invention provides a transmission scheduler for use in transferring information, in the form of cells, each associated with a path, in a digital network. The network provides a plurality of service rate classes, based on, for example, transmission rates for the various paths. The cells for each path in a path queue, and the path queues for the paths associated with each service rate class are aggregated in a service rate queue. The transmission scheduler includes a cell selector for selecting from among the service rate queues, one path queue to provide a cell for transmission, and a cell transmitter for transmitting the cell provided by the selected path queue.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 11A through 11C depicts a flow diagram illustrating operations performed by the scheduling unit depicted in FIG. 10.

DETAILED DESCRIPTION OF AN ILLUSTRATIVE EMBODIMENT

Figure 1:
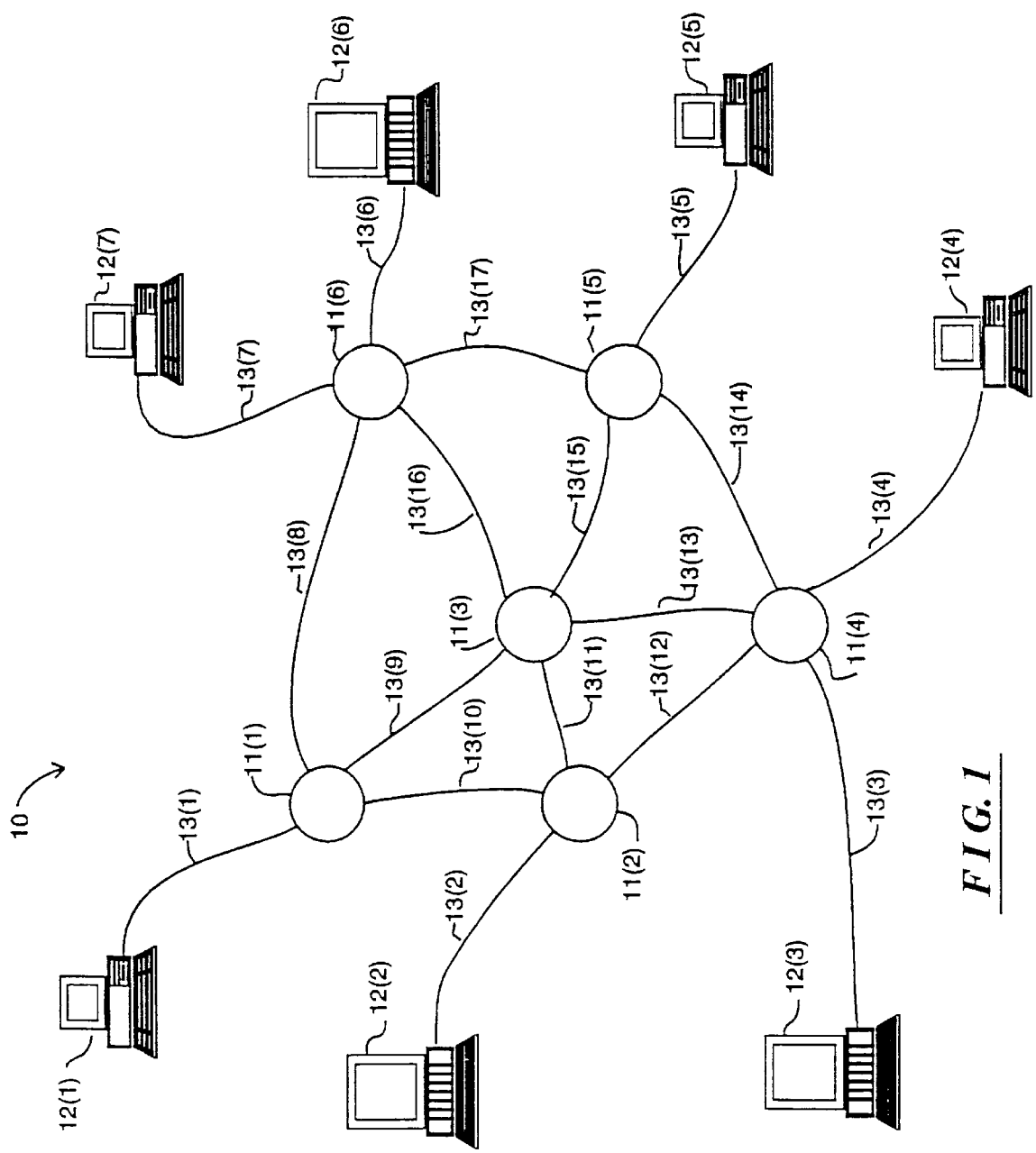
FIG. 1 schematically depicts a computer network including a switching node constructed in accordance with the invention.

FIG. 1 schematically depicts a computer network 10 including a plurality of switching nodes 11(1) through 11(N)

(generally identified by reference numeral $11(n)$) for transferring signals representing data among a number of devices, which in FIG. 1 are represented by computer systems 12(1) through 12(M) (generally identified by reference numeral $12(m)$). The computer systems $12(m)$, as is conventional, process data, in accordance with their program instructions to generate processed data. In their processing, a computer system $12(m_s)$ (subscript "S" referencing "source") may, as a source computer system, need to transfer data, processed data and/or program instructions (all of which will be referred to herein generally as "information") to another, destination, computer system $12(m_D)$ (subscript "D" referencing "destination"), which may need to use the transferred information in its operations. Each computer system $12(m)$ is connected over a communication link, generally identified by reference numeral 13(1), to a switching node $11(n)$ to facilitate transmission of data thereto or the reception of data therefrom.

The switching nodes $11(n)$ are interconnected by communication links, also generally identified by reference numeral 13(1), to facilitate the transfer of data thereamong. The communication links 13(1) may utilize any convenient data transmission medium; in one embodiment, the transmission medium of each communication link 13(1) is selected to comprise one or more fiber optic links. Each communication link 13(1) is preferably bidirectional, allowing the switching nodes $11(n)$ to transmit and receive signals among each other and with computer systems $12(m)$ connected thereto over the same link; in the embodiment in which the communication links 13(1) are fiber optic links, two optical fibers may be provided for each communication link 13(1), each of which facilitates unidirectional transfer of optical signals between switching nodes $11(n)$ or between a switching node $11(n)$ and a computer system $12(m)$.

Figure 2:
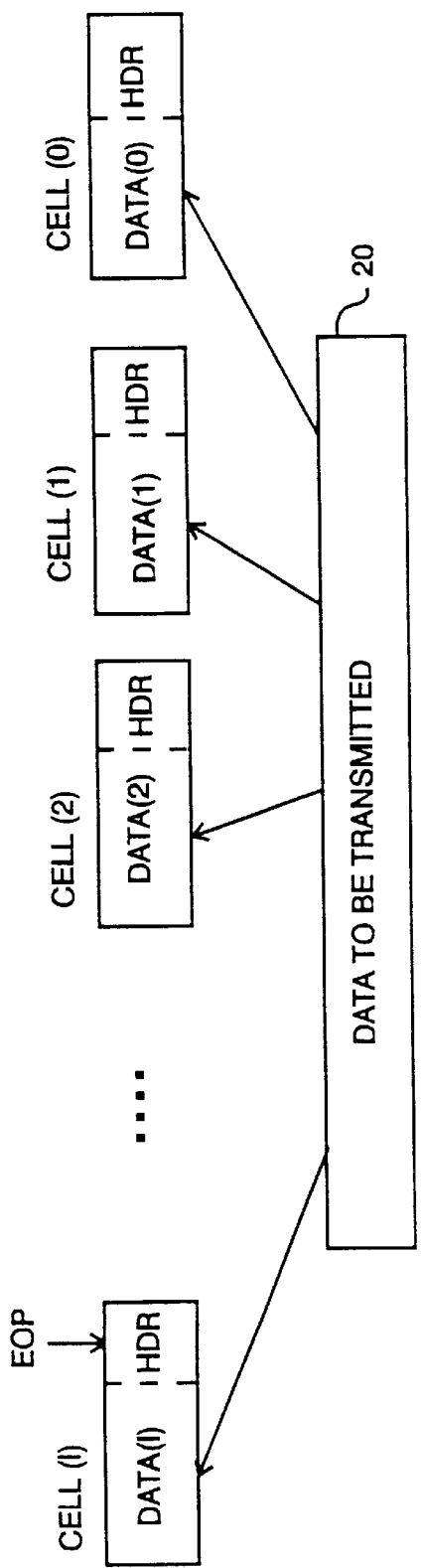
FIGS. 2 and 3 schematically illustrate the structure of message packets and constituent cells transferred over the network depicted in FIG. 1.

In one embodiment, the network 10 transfers data using the well-known "ATM" ("Asynchronous Transfer Mode") transfer methodology. That methodology is generally described in C. Partridge, *Gigabit Networking*, (Reading MA: Addison Wesley Publishing Company, 1994), primary in chapters 3 and 4, and D. McDysan, et al., ATM Theory And Application (McGraw Hill, 1995) and will not be described in detail. Generally, with reference to FIG. 2, in the ATM methodology, the computer systems $12(m)$ and the switching nodes $11(n)$ transmit data in the form of fixed-length "cells." In the ATM data transfer methodology, for a packet 20 to be transmitted from a source computer system $12(m_s)$ to a destination computer system $12(m_D)$, the source computer system $12(m_s)$ allocates the data packet 20 to a plurality of "cells," identified CELL(1) through CELL(I) (generally identified "CELL(i)"), for transmission serially over the communication link 13(1) to initiate transfer thereof over the network 10. Each cell, which is shown in greater detail in FIG. 3, includes a header portion HDR(i) and a data portion DATA(i). The header portion HDR(i) includes connection path information, including virtual path and virtual circuit identifiers in respective fields identified by reference numerals 21 and 22, respectively, which controls the transfer of the cell between switching nodes $11(n)$ over the network 10 over a path, or connection, from the source computer system 12(mS) to the destination computer system 12(mD). In the aforementioned ATM methodology, the viral path and virtual circuit identifiers which are used in transferring a particular packet from a source computer system $12(m_s)$ to a destination computer system $12(m_D)$ need not be the same for all switching nodes $12(n)$ along the path to be used from the source computer system $12(m_s)$ to the destination computer system $12(m_D)$, and in addition they need not be unique across the entire computer network 10. Typically individual virtual path and virtual circuit identifiers will be assigned by the source computer system $12(m_s)$ and the switching node $11(n)$ connected thereto, by each pair of switching nodes along the path from the source computer system $12(m_s)$ to the destination computer system $12(m_D)$ and by the switching node $11(n)$ connected to the destination computer system $12(m_D)$ and the destination computer system $12(m_D)$ The header portion HDR(i) also includes a "miscellaneous" field 23 which includes other routing control information as will be generally described below. Both the header portion HDR(i) and the data portion DATA(i) of each cell are of fixed, predetermined lengths; in one embodiment the header portion HDR(i) comprises five bytes and the data portion DATA(i) comprises forty-eight bytes. If the amount of data to be transmitted in a message is not an integral multiple of the size of the data portion DATA(i) of each cell, the source computer system $12(m_s)$ will generally pad the data portion DATA(I) of the last cell CELL(I) to ensure that the data portion DATA(l) has the required length.

As noted above, the source computer system $12(m_s)$ transmits the series of cells CELL(l) through CELL(I) generated from a data packet 20 in order, and the network 10 is to deliver the cells to the destination computer system $12(m_D)$ in the order in which they are transmitted. The destination computer system $12(m_D)$ must receive all of the cells transmitted by the source computer system $12(m_s)$ in order to reconstruct the packet 20. In the aforementioned ATM transfer methodology, the cells do not contain ordering information, and so the destination computer system $12(m_D)$ determines the proper order to reconstitute the packet 20 from the order in which it receives the cells. The last cell CELL(I) includes, in the miscellaneous field 23, an end of packet indicator, designated EOP in FIG. 2, to indicate that it is the last cell for the packet.

Figure 4:
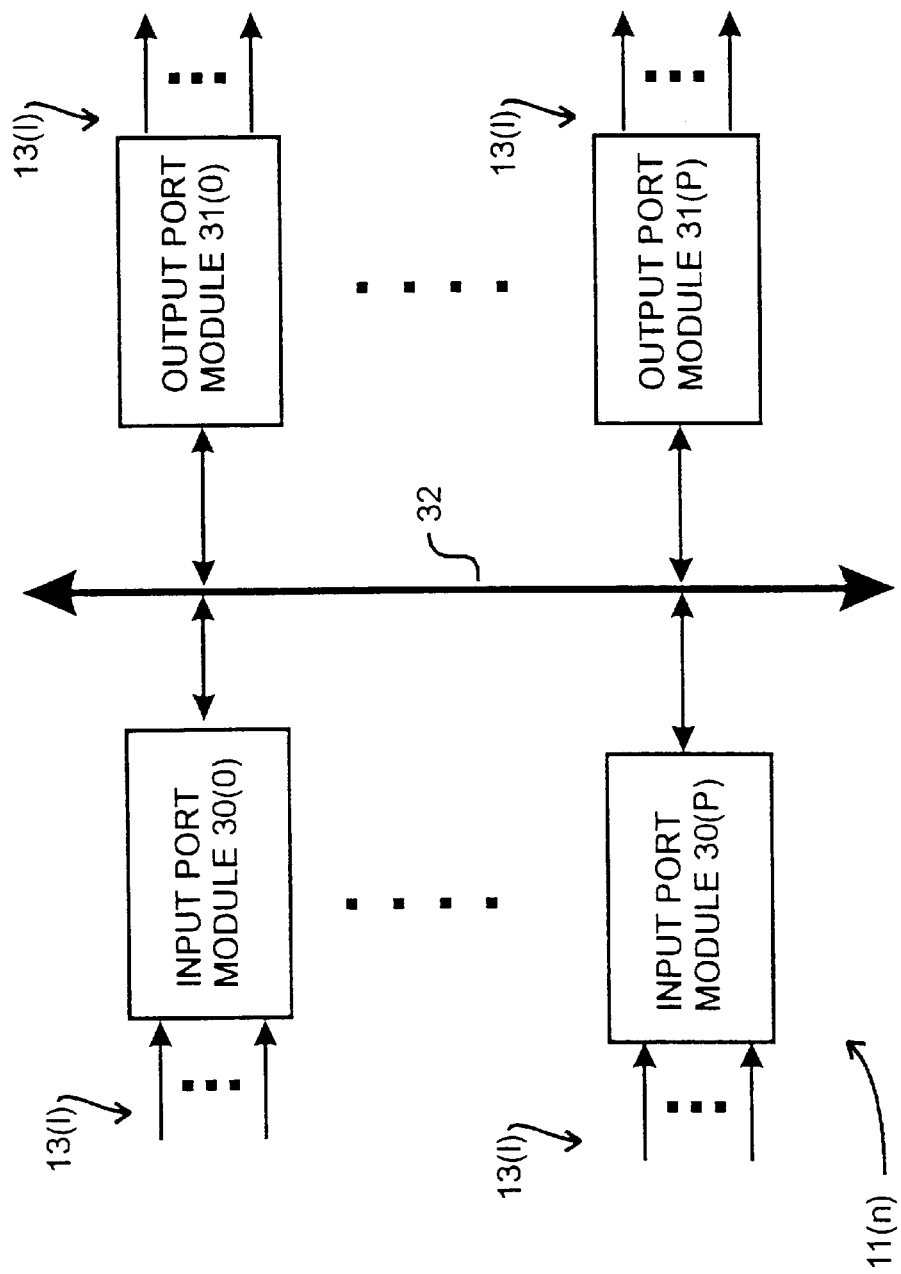
FIG. 4 schematically depicts the structure of a switching node useful in the network depicted in FIG. 1.

Before proceeding further, it would be helpful to generally describe the structure of a switching node $11(n)$ useful in the network 10 depicted in FIG. 1. FIG. 4 depicts a functional block diagram of such a switching node $11(n)$. With reference to FIG. 1, the switching node $11(n)$ includes a plurality of input port modules 30(0) through 30(P) (generally identified by reference numeral $30(p)$) and a plurality of output port modules 31(0) through 31(P) (generally identified by reference numeral $31(p)$) interconnected by one or more buses 32. Each input port module $30(p)$ is connected to one or more communication links 13(1), in particular for receiving signals representative of cells CELL(i) thereover. Each communication link 13(1) which is connected to a particular input port module $30(p)$ is, in turn, connected to receive cells CELL(i) from a particular source computer system $12(m_s)$ or other switching node $11(n)$ in the network 10. After an input port module $30(p)$ receives respective cells CELL(i) from the communication links 13(1) connected thereto, it (that is, the input port module $30(p)$) transmits the received cells CELL(i) to the output port modules $31(p)$.

Each output port module $31(p)$ is connected to one or more communication links 13(1) and transmits signals thereover which are representative of cells CELL(i) which were received by an input port module $30(p)$. Similarly, each communication link 13(1) connected to a particular output port module $31(p)$ is, in turn, connected to transfer cells CELL(i) to a particular other switching node $11(n)$ or destination computer system $12(m_D)$ in the network 10. The number of input port modules $30(p)$ may conveniently correspond to the number of output port modules $31(p)$, and each output port module 31(p) may conveniently be connected to transmit cells CELL(i) to the switching nodes 11(n) and/or computer systems 12(m) from which input port modules 30(p) receive cells CELL(i).

As noted above, each input port module 30(p) receives cells from the communication links 13(1) connected thereto and transmits them over the bus 32 to the output port modules 31(p) for transmission. The output port modules 31(p) perform a number of operations, including converting the virtual path and virtual circuit identifiers in fields 21 and 22 (FIG. 3), if necessary, prior to transmission and scheduling the cells CELL(i) for transmission over the respective communication links 13(1) connected thereto. All of the output port modules 31(p) are generally similar, and FIG. 5 depicts a functional block diagram of an output port module 31(p) which is useful in the switching node depicted in FIG. 4.

Figure 5:
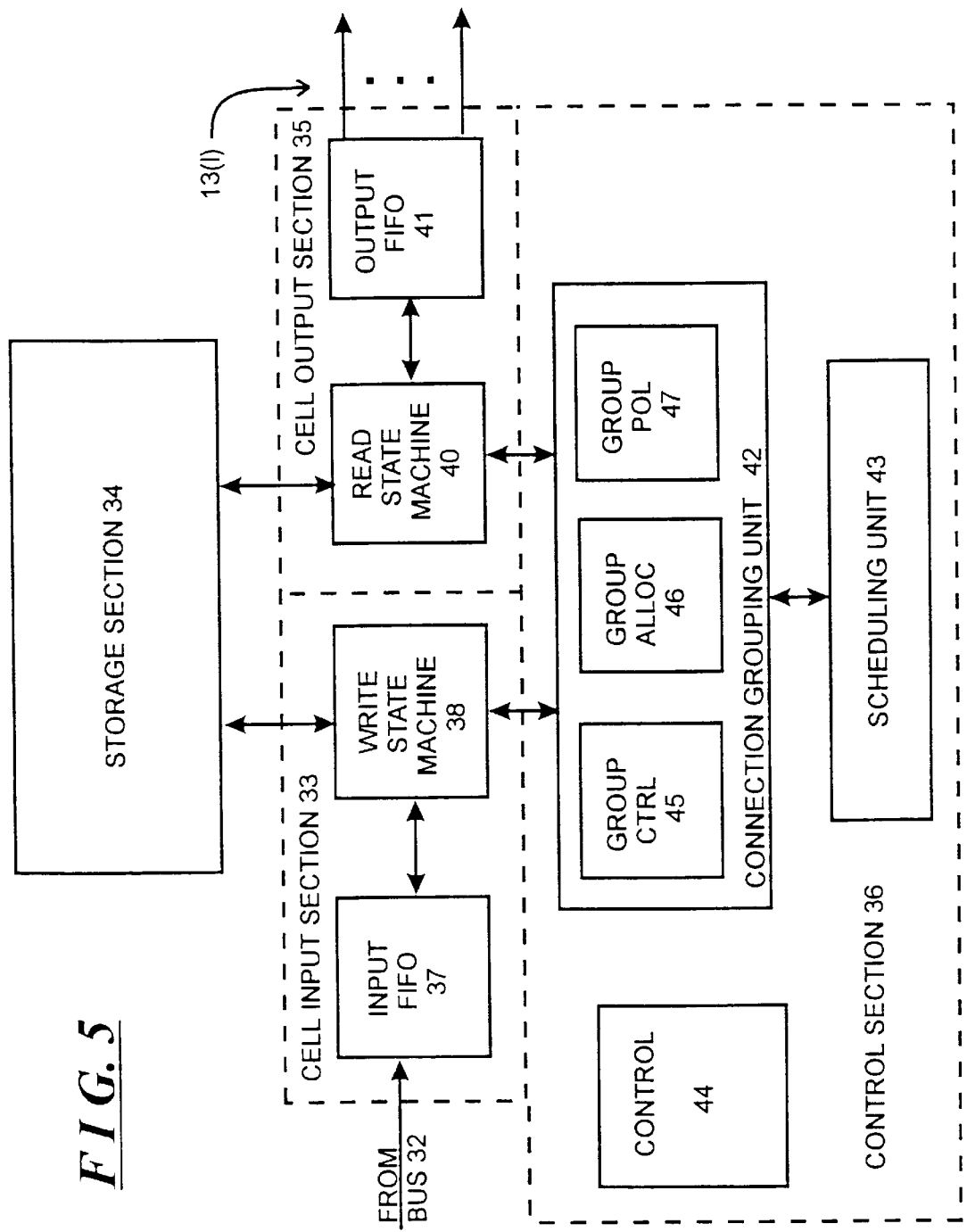
FIG. 5 depicts a functional block diagram of an output port module useful in the switching node depicted in FIG. 4.

With reference to FIG. 5, the output port module 31(p) includes an input section 33, a storage section 34, and an output section 35 all under control of a control section 36. Generally, the input section 33 receives cells CELL(i) from the bus 32 and, under control of the control section 36, loads them into the storage section 34. On the other hand, the output section 34 retrieves cells CELL(i) previously stored in the storage section 34 for transmission over the respective communication links 13(1). As will be described below in detail in connection with FIGS. 6 through 10, the control section 36 controls the input section 33 to store the cells CELL(i) in the storage section 34 in groups to facilitate scheduling of transmissions by the output section 35, and controls scheduling of transmissions from the various groups by the output section 35.

More specifically, and with continued reference to FIG. 5, the input section 33 includes an input first-in, first-out (FIFO) buffer 37 and a write state machine 38. The input FIFO 37 receives and buffers cells CELL(i) from the bus 32. The write state machine 38 retrieves cells CELL(i) from the FIFO buffer 37, determines whether a retrieved cell CELL(i) is associated with a connection that is being handled by the output port module 31(p), and, if so, and if other conditions are satisfied, under control of the control section 36 stores the retrieved cell CELL(i) in the storage section 34 in a queue associated with the connection. In addition, the write state machine 38, under control of the control section 36, will update other information concerning the connection for the cell CELL(i), as will be described below.

The output section 35, under control of the control section 36, retrieves cells CELL(i) from the storage section. The control section 36 will control the selection of the particular connections from whose queues cells CELL(i) are selected for transmission. The output section 35 includes a read state machine 40 and an output FIFO 41. The read state machine 40 controls the retrieval of cells CELL(i) from the queues associated with connections selected by the control section 36, and transfers the retrieved cells CELL(i) to the output FIFO 41 for buffering prior to transmission over the communication links 13(1) connected thereto. After retrieving a cell CELL(i) from the storage section 34, the read state machine 40 will enable the header of the cell to be updated with new virtual path and virtual circuit identifiers, if conversion is necessary, which are transferred when the cell CELL(i) is transmitted.

As will be described in detail below, the queues associated with the various connections are organized into groups for transmission scheduling purposes, and the control section 36 performs a number operations in establishing and maintaining the groups, as will be described below. By way of background, the ATM transfer methodology defines a number of types of service classes, and, for several of those service classes, service rate guarantees may be provided. For connections which have a particular service rate guarantee, the network 10 will guarantee that cells associated with those connections will be transferred at a particular rate through the network 10. This service rate may differ as among the various connections, although for various ones of the connections being serviced by a switching node 11(n) the service rate guarantees may be similar or identical. Connections may be provided with a minimum service rate, in which case they will be ensured at least a specified minimum rate, but may be transferred at a faster rate when there is available transfer bandwidth above the bandwidth that required for the connections for which there is a service rate guarantee. For yet other connections, the service rate may be unspecified, and instead be an "available" service rate, in which the network 10, and specifically the switching nodes 11(n) will transfer cells CELL(i) for those connections when there is available transfer bandwidth above that required for the connections for which there is a service rate guarantee.

To accommodate scheduling of cell transmission for the various connections in an efficient manner, the queues maintained in the storage section 34 for the various connections are further organized into groups, with each of the groups being associated with one of the service rates for the connections that the output port module 31(p) is handling. The control section 36 also establishes or updates groups when establishing the respective connections, and is also responsible for the groups and, using the scheduling unit 43, scheduling transmissions of cells CELL(i) from the various groups to ensure that the service rate guarantees for the connections associated with each group is maintained. The control section 36, which is shown in functional block diagram form in FIG. 5, includes a connection grouping unit 42 and the scheduling unit 43. The connection grouping unit 42, in turn, includes a group controller module 45, a group allocation module 46 and a group policy module 47, whose functions will be described below.

Figure 3:
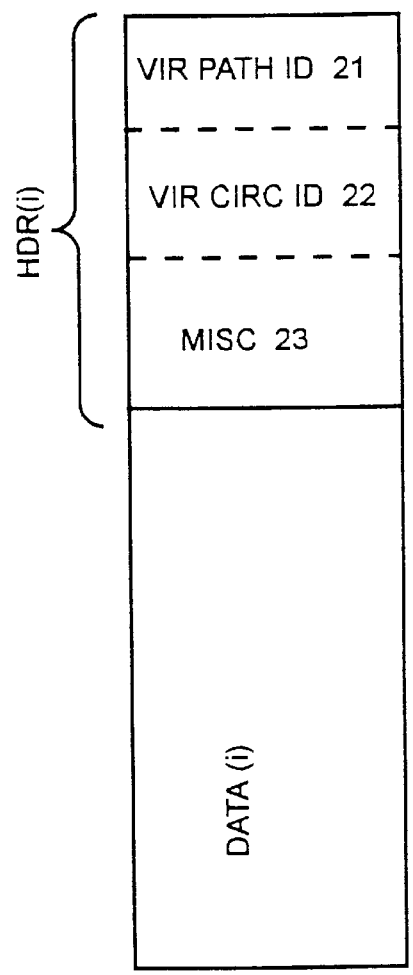
Figure 6:
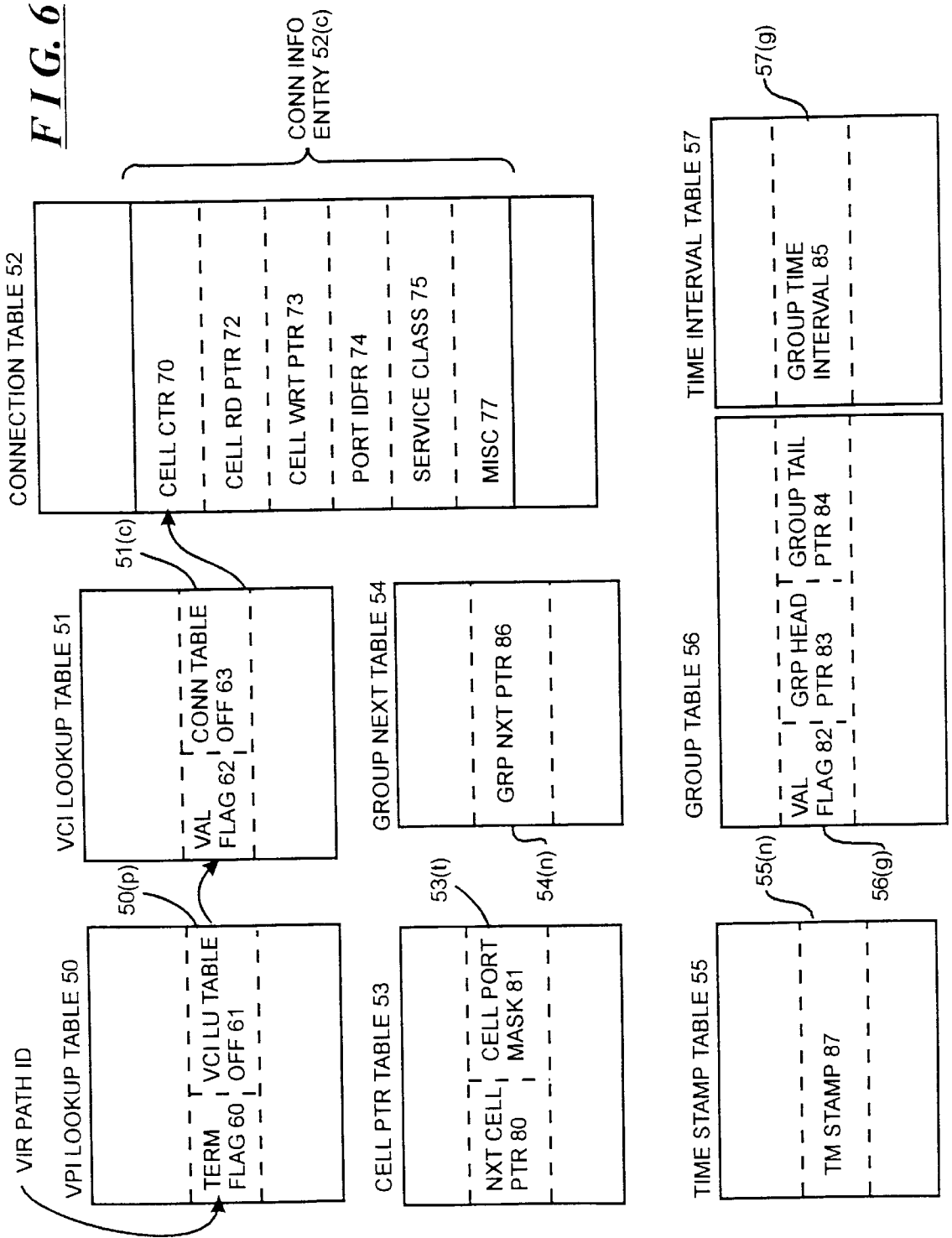
FIG. 6 depicts several data structures which are used by the output port module in transferring information in the network depicted in FIG. 1.

Before proceeding further, it would be helpful to describe various data structures which are used by the elements depicted on FIG. 5 in controlling the grouping of the various connections by the control section 36 and the storage, scheduling and retrieval of the respective cells CELL(i). FIG. 6 depicts in detail a number of such data structures. With reference to FIG. 6, the control section 36 generally makes use of a number of tables, including a virtual path identifier lookup table 50, a virtual circuit identifier lookup table 51, a connection table 52, a cell pointer table 53, a group next table 54, a time stamp table 55, a group table 56 and a time interval table 57. The connection table 52 includes status information for each connection, that is, each connection, which is maintained by the switching node through the particular output port module 31(p). The connection table 52 includes a number of entries generally identified by reference numeral 52(c), which is identified for each connection by pointers in the viral path identifier table 50 and virtual circuit identifier 51. In particular, the virtual path identifier table 50 includes a number of entries generally identified by reference numeral 50(p), each of which is associated with one encoding of the virtual path identifier field 21 of a cell CELL(i) (FIG. 3). That is, the contents of the virtual path identifier field 21 of a cell received by the output port module 31(p) comprise an offset value which identifies one of the entries 50(p) in the virtual path identifier table 50.

Each entry 50(p) in the vial path identifier table 50 includes a terminal flag 60 and a virtual circuit identifier lookup table offset field 61. The virtual circuit identifier lookup table offset field 61, in turn, contains a value which points to an entry 51(c) in the virtual circuit identifier lookup table 51. The virtual circuit identifier lookup table 51 includes a number of entries 51(c), each of which includes a valid flag 63 and a connection table pointer field 63. The valid flag 63 indicates whether the connection table pointer field 63 contains a valid connection table pointer. If the valid flag 63 indicates that the connection table pointer field 63 contains a valid connection table pointer, the connection table pointer, in turn, points to an entry 52(c) in the connection table for that connection.

As iced above, the entries 51(p) of the virtual path identifier lookup table 50 also include a terminal flag 60. The terminal flag 60 indicates whether the particular connection identifiers (that is, the virtual path identifier and/or virtual circuit identifier in fields 21 and 22 of the cell CELL(i)) for the connection terminate at the particular switching node 11(n) which includes the output port module 31(p). If so, the connection identifiers of cells CELL(i) received for the connection will be updated to reeve updated values before the cells CELL(i) are transmitted, using virtual path and virtual circuit identifier update information in a table (not shown).

Each entry 52(c) of the connection table 52 includes information for controlling the storage of cells CELL(i) by the input section 33 in the storage section 34 and the retrieval of cells CELL(i) from the storage section 34. In particular, each entry 52(c) includes a number of fields, including a cell counter field 70, a cell read pointer 72, a cell write pointer 73, a port identifier field 74, a service class field 75, and a miscellaneous field 77. The cell counter field 70 includes a count value identifying the number of cells CELL(i) that are stored for the connection associated with entry 52(c) in the storage section 34. When the write state machine 38 stores a cell CELL(i) associated with a connection in the storage section 34, it can increment the contents of the cell counter field 70, and when the read state machine retrieves a cell CELL(i) associated with the connection from the storage section 34 for transmission, it can decrement the contents of the cell counter field. In one embodiment if the cell counter field 70 indicates that all cells CELL(i) that have been received for the connection have been transmitted, the connection should be deleted from the group with which it is associated so that the connection will not be scheduled by the scheduler unit 43 as described below. If a cell CELL(i) is later received for the connection, after the write state machine 38 stores the cell in the storage section 34 and incrementing the cell counter field 70 as described above, the connection can thereafter again be linked into the appropriate group.

The cell read pointer 72 identifies the next cell in the storage section 34 which is to be transmitted for the connection. The cell write pointer 73, on the other hand, identifies the last cell which was stored in the storage section 34 for the connection. When the write state machine 38 is to store a cell CELL(i) associated with a connection in the storage section 34, it can identify the last cell stored in the storage section 34 by referencing the cell write pointer 73, and make use of pointers in the cell pointer table 53 to link the new cell CELL(i) to other cells associated with the connection 5 thereby to form a queue as described below. When the read state machine 40 is to retrieve a cell CELL(i) for a connection from the storage section 34 for transmission, it can make use of the cell read pointer 72 to identify the cell CELL(i) to be retrieved. The write state machine 38 can use the virtual path identifier in field 21 of the cell CELL(i) to be stored, and the virtual path identifier lookup table 50 and virtual circuit identifier lookup table 51 to identify a connection information entry 52(c) for the connection, from which it can obtain the cell write pointer 73. Similarly, the read state machine 40 can use connection identifiers provided by the control section 36, in particular by the connection grouping unit 42 and scheduling unit 43 as described below, as well as the virtual path identifier lookup table 50 and virtual circuit identifier lookup table 51 to identify a connection information entry 52(c) for the connection, from which it can obtain the cell read pointer 72.

The port identifier field 74 identifies the particular one(s) of the communication links 13(1) connected to the output port module 31(p) over which cells for the connection are to be transmitted. Thus, if the connection is a unicast connection, for which the output port module 31(p) will transmit cells CELL(i) over a single communication link 130), the port identifier field 74 will identify only one communication link 13(1), but if the connection is a multicast connection, for which the output port module 31(p) will transmit cells over multiple communication links 13(1), the port identifier field 74 will identify each of the communication links 13(1) connected to the output port module over which cells will be transmitted. The service class field 75 identifies the particular ATM service class for the connection, thereby indicating whether the connection has a guaranteed service rate, a minimum service rate, or an available rate. The miscellaneous field 77 includes other information which may be useful for the connection.

The cell pointer table 53 is used to associate the various cells stored in the storage section 34 and links cells for a connection into a linked list. Generally, the storage section 34 includes a series of storage locations identified by successive addresses, each of which can store one cell. The cell pointer table 53 also contains status information which is used in controlling multicasting, as will be described below. The cell pointer table 53 includes a series of entries generally identified by reference numeral 53(t), each of which is associated with a respective cell storage location in the storage section 34; for example, the first entry of the cell pointer table 53, identified by reference numeral 53(0) (not shown in FIG. 6), is associated with the cell storage location having address (0), the second entry, identified by reference numeral 53(1), is associated with the cell storage location having address (1), and so forth.

Each entry 53(t) in the cell pointer table 53 includes a plurality of fields, including a next cell pointer field 80 and a cell port mask field 81. The cell pointer field 80 contains a cell pointer that, along with the cell read and write pointers 72 and 73 of the connection information entry 52(c) of the connection table 52, serve to define the queue of cells CELL(i) buffered for the connection associated with the connection information entry 52(c). That is, the cell read pointer 72 of the connection information entry 52(c) points to the first cell CELL(i) that is to be transmitted for the connection, and the next cell pointer in field 80 of the entry 53(t) in the cell pointer table 53 that is associated with that cell CELL(i) points to the second cell CELL(i) to be transmitted for the connection. Similarly, the next cell pointer in field 80 of the entry 53(t) in the cell pointer table that is associated with the second cell CELL(i) to be transmitted for the connection points to the third cell CELL (i) to be transmitted for the connection, and so on. Thus, the cell read pointer 72 and the series of next cell pointers in fields 80 so linked in the cell pointer table 53 collectively define a queue of cells that are buffered in the storage section 34 for the connection. The cell write pointer 73 in the connection information entry 52(c), in turn, points to the last cell CELL(i) that is being buffered for the connection. Storage locations which do not contain cells CELL(i) awaiting transmission are linked in a free queue. The write state machine 38 obtains a storage location from the free queue when it stores a cell CELL(i) in the storage section 34. When the read state machine 40 retrieves a cell CELL(i) from a storage location for transmission, it links the storage location into the free queue, in which case the storage location may be later used by the write state machine 38 for another cell.

As noted above, the entries 53(t) of the cell pointer table 53 also include a cell port mask 81. The cell port mask includes a number of port bits, each of which is associated with one of the communication links 13(1) connected to the output port module 31(p), and identifies the communication link or links 13(1) over which the cell CELL(i) that is associated with the entry 53(t) is or are to be transmitted. If the cell CELL(i) is associated with a unicast connection, one bits of the cell port mask 81 will be set to identify the one communication link 13(1) over which the cell CELL(i) will be transmitted. On the other hand, if the cell CELL(i) is associated with a multi-cast connection, a plurality of bits of the cell port mask 81 will be set, each associated with one of the communication links 13(1) over which the cell CELL(i) is to be transmitted for the connection. As the cell CELL(i) is transmitted over each communication link 13(1), the associated bit of the cell port mask 81 will be reset.

The group table 56, time interval table 57, and group next table 54 are used to associate and link connections defined by connection information entries 52(c) in the connection table 52, into groups for transmission scheduling purposes. The grouping mechanism will be described in detail below in connection with FIGS. 7 and 8. Preliminary, however, the group table 56 includes a number of entries generally identified by reference numeral 56(g), each of which is associated with one of the groups. Similarly, the time interval table 57 includes a like number of entries 57(g), each of which is associated with one of the groups. The group next table 54, on the other hand, includes a number of entries generally identified by reference numeral 54(n), each of which is associated with one of the connection information entries 52(c) in the connection table 52.

Each group table entry 56(g) includes a number of fields, including a valid flag 83, a group head pointer 83 and a group tail pointer 84. The valid flag 83 indicates whether the contents of the entry 56(g) are valid or invalid. If the valid flag 83 of a group table entry 56(g) indicates that the contents of the entry 56(g) are invalid, no group is associated with the entry 56(g). On the other hand, if the valid flag 83 indicates that the contents of the entry 56(g) are valid, the group head pointer field 83 points to an entry 52(c) for a first, or "head," connection in the connection table 52 that forms part of the group that is associated with the group table entry 56(g). The entry 54(n) in the group next table 54 that is associated with that connection information entry 52(c) (that is the entry 52(c) of the connection table 52 pointed to by the group head pointer field 83), in turn, contains a group next pointer 86 that identifies the connection information entry 52(c) that is associated with a second connection in the same group. Similarly, the entry 54(n) in the group next table 54 that is associated with the second connection information entry 52(c) contains a group next pointer 86 that identifies the connection information entry 52(c) that is associated with the third connection in the same group, and so on for successive connections in the group. Thus, the group head pointer 83 and the series of group next pointers 86 in entries 54(n) that are so linked collectively define a list of connections that comprise the group associated with entry 56(g) of the group table. The group tail pointer 84 in the entry 56(g), in turn, points to an entry 52(c) in the connection table 52 which corresponds to a last, or "tail," connection associated with the group. The group next pointer 83 that is associated with the last, or "tail," connection in the group may, for example, contain a null value or a pointer pointing to the entry 56(g) of the group table 56, in which case the series of connection information entries 52(c) for each group will be linked together in a list; alternatively, the group next pointer 83 associated with the tail connection may point to the connection information entry 52(c) associated with the head connect, in which case the series of connection information entries 52(c) for each group will be linked together in a circular list.

The groups of connections defined by the group table 56 are grouped for transmission scheduling purposes. The time interval table 57 includes information that is used to update the transmission scheduling information for the various connections in the groups, and the time stamp table 55 includes scheduling information for the various connections associated with the connection information entries 52(c) in the connection table 52. The time stamp table 55 includes a plurality of entries 55(c), with each entry 55(c) being associated with a correspondingly-indexed entry 52(c) in the connection table 52. Each entry 55(c) of the time stamp table 55 contains a time stamp 87 that is used in scheduling the transmission of cells CELL(i) for the connection associated with the connection information entry 52(c). The time interval table 57, in turn, includes group time interval values 85 identifying the time interval between transmissions of cells CELL(i) for the various connections associated with one of the groups defined by the group table 56. In one embodiment, each communication link 13(1) over which a multicast message is to be transmitted may be associated with a different time interval, and thus be associated with a different group time interval value 85 in the time interval table 57. The time interval table 57 includes a plurality of entries generally identified by reference numeral 57(g), each of which is associated with the correspondingly-indexed entry 56(g) of the group table 56. When a connection associated with the group defined by an entry 56(g) in the group table 56 is serviced, that is, when a cell CELL(i) is transmitted from the connection, the time stamp 87 in the entry 55(n) of the time stamp table that is associated with the connection will be incremented by an amount corresponding to the group time interval as indicated in the entry 57(g) of the time interval table whose index "g" corresponds to the index of the group's entry 56(g) in the group table 56.

Figure 7:
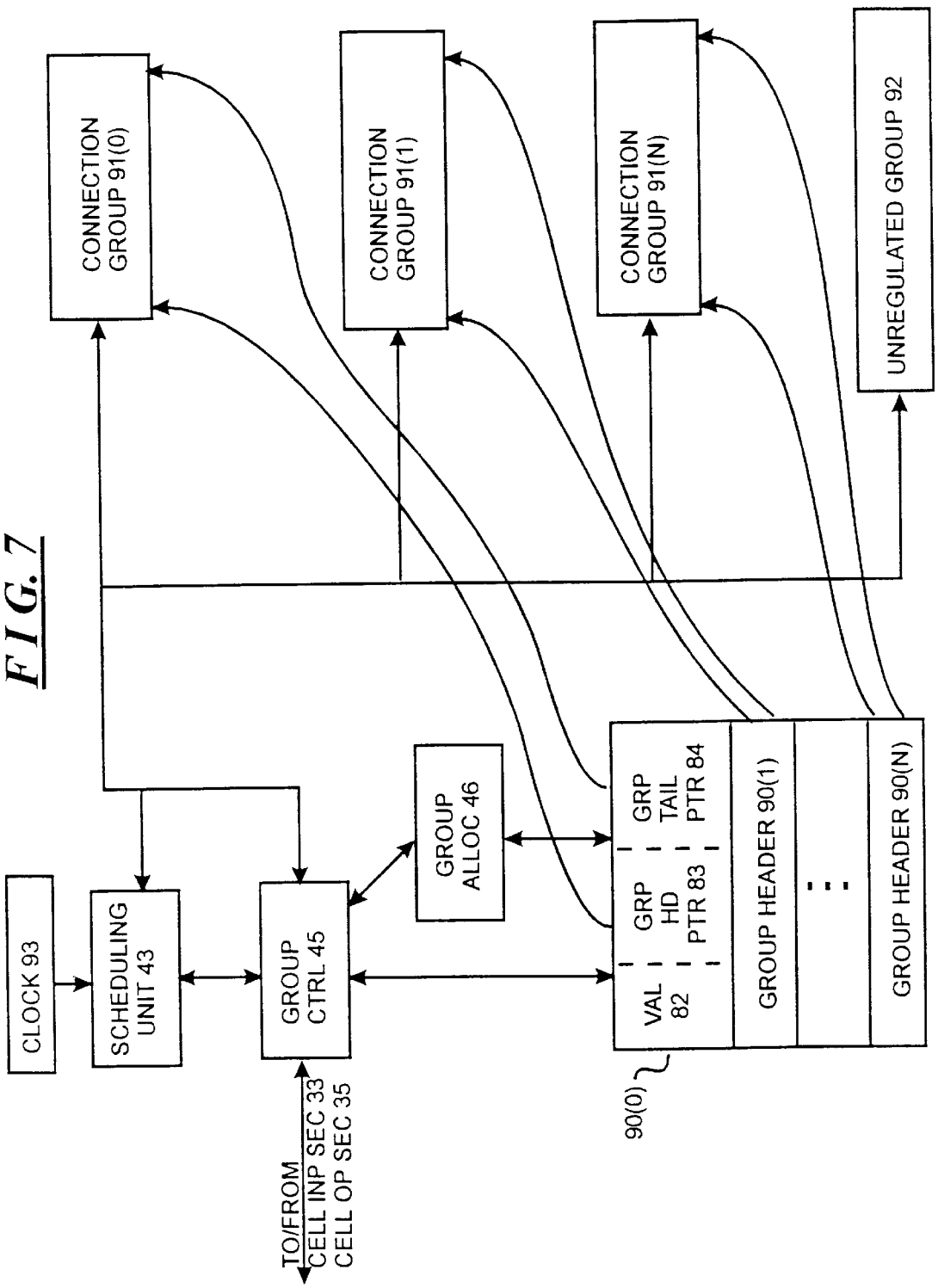
FIGS. 7 through 9 illustrate the structure of groups which are useful in scheduling the transfer of information by the output port module depicted in FIG. 6.
Figure 8:
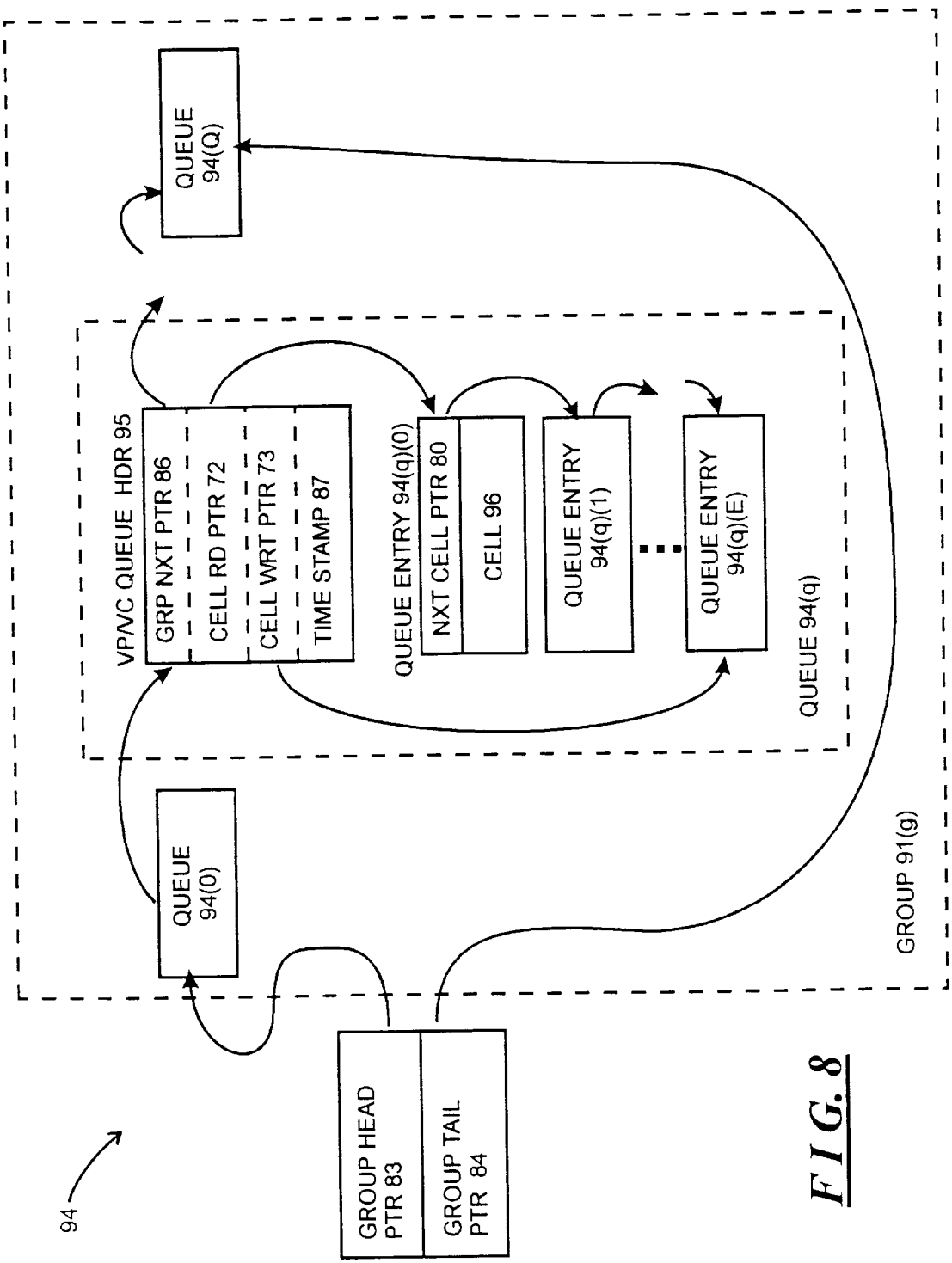
Figure 9:
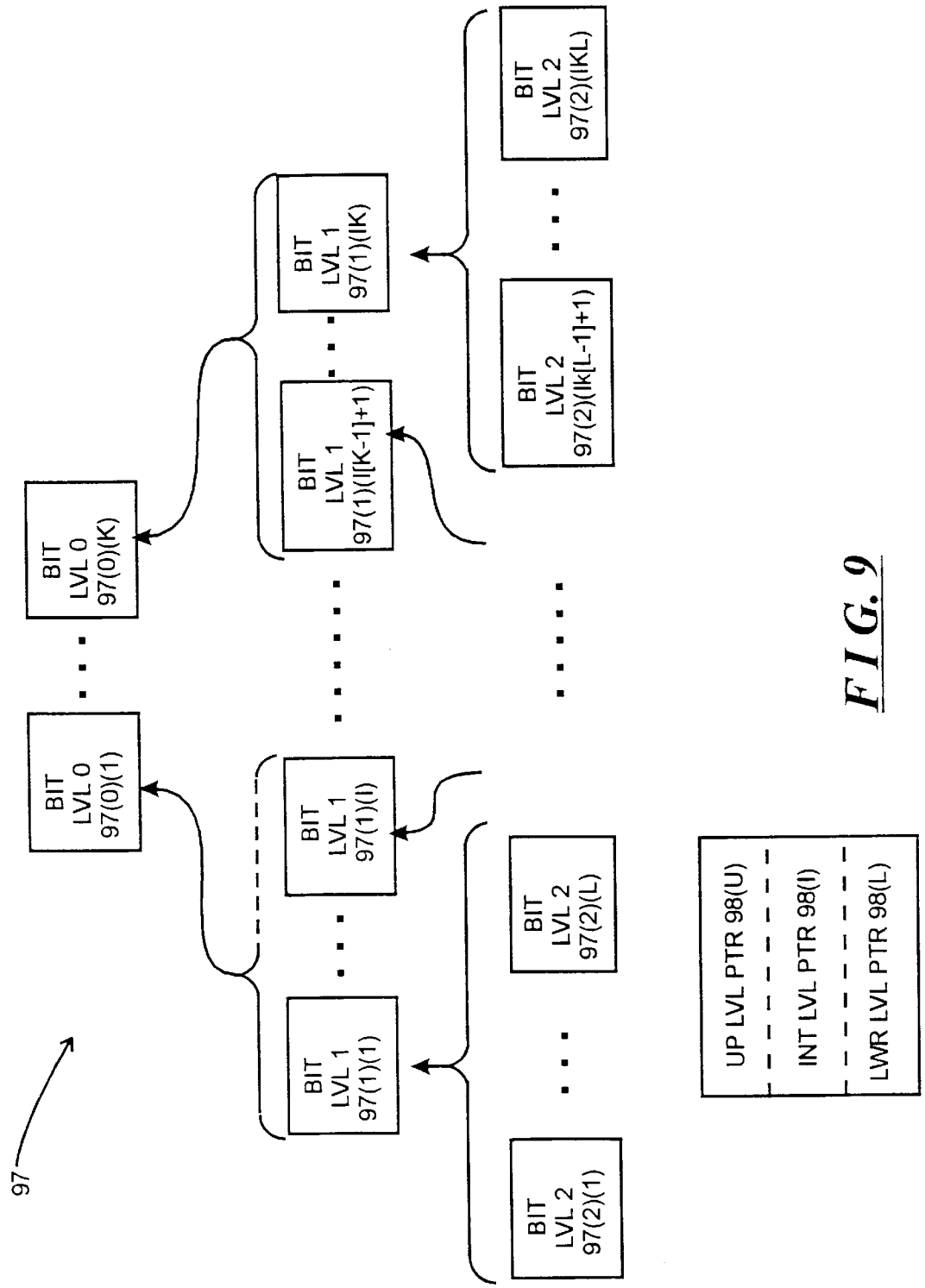

With this background, the grouping mechanism provided by connection grouping unit 42 will be described in detail in connection with FIGS. 7 through 9, with FIGS. 7 and 8 depicting details of the grouping mechanism used in connection with connections having an associated guaranteed or guarantee minimum transfer rate, and FIG. 9 depicting details for connections which share in the available transfer rate above that required for the guaranteed service rates. With reference initially to FIGS. 7 and 8, the output port module 31(p) generally provides one or more groups 91(1) through 91(G) (generally identified by reference numeral 91(g)) which are defined by the information in respective entries 56(g) of the group table 56. As noted above, if the valid flag 82 of an entry 56(g) of the group table 56 is set, the entry 56(g) of the group table 56 comprises a group header 90(*n*), with the group head pointer 83 of the entry 56(*g*) pointing to an entry 52(*c*) in the connection table 52 which corresponds to the head connection for the group, and the group tail pointer 84 pointing to an entry 52(*c*) in the connection table which corresponds to the tail connection for the group. If the valid flag 82 associated with an entry 56(*g*) of the group table 56 is clear, the entry 56(*g*) does not have an associated group 51(*n*), in which case the entry 56(*g*) can be used for establishing a new group, as will be described below.

The general structural organization of the various groups 91(*g*) are all generally similar. FIG. 8 schematically depicts the details of the structural organization of one such group, identified by reference numeral 91(g). With reference to FIG. 8, group 91(*g*) comprises a list 94 which, in turn, comprises a number of queues 94(q), all of which have generally similar service rates. One queue, namely queue 94(0), comprises the first or "head" queue of the group 91(*g*) and is pointed to by the group head pointer 83. Another queue, namely queue 94(Q), comprises the last or "tail" queue of the group 91(*g*) and is pointed to by the group tail pointer 84. The queues 94(*q*) for the various connections in the list 61 are arranged in an order corresponding to the order in which cells CELL(i) are to be transmitted to maintain the guaranteed service rate for all of the connections associated with the group 91(g). That is, when the scheduling unit 43 selects the group 91(*g*) to provide a cell CELL(i) for transmission, the cell will be provided by the head queue 94(0) in the group 91(g). Thereafter, the group controller module 45 will re-organize the list 94 for group 91(g), so that the next queue 94(1) after the queue 94(0) from which a cell was just transmitted will become the new head queue of the group 91(g), and the queue from which the cell was just transmitted will become the new tail queue of the group 91(g). When a cell CELL(i) is next transmitted from the group 91(g), the cell CELL(i) will be selected from the new head queue of the group 91(g). Thus, the queues 94(*q*) in the list 94 will be maintained in the order in which cells therefrom will be transmitted, and a cell CELL(i) will always be selected for transmission a cell from the queue 94(0) at the head of the respective group 91(*g*). The scheduling unit 43 will, in turn, select among the various groups 91(g), in a manner described below, to ensure that the guaranteed service rates are maintained for all of the connections associated with the queues 94(*q*) in the various groups 91(g).

Each queue 94(*q*) in a group 91(*g*) is defined by an associated queue header 95 comprising fields from a various ones of the data structures described above in connection with FIG. 6 that (i) link the queue 94(*q*) in the list 94, (ii) link the series of cells CELL(i) for the connection associated with the queue 94(*q*) to the queue header 95, and (iii) contain cell transmission status information for the connection that is associated with the queue 94(q).

The queue header 95 associated with a queue 94(*q*) includes the group next pointer field 86 from the connection information entry 52(*c*) of the group next table 54 (FIG. 6) for the connection associated with the queue 94(q), which contains a group next pointer that points to the next queue 94(q+1) in the group 51(0). As indicated above, the group next pointer in field 86 of the last queue 94(Q) in the list 94 may contain a null value indicating that it is the last queue in the list 94, or it may point to the group tail pointer 84 for the group, or alternatively it may point to the head queue 94(0) in the list 94 in which case the list 94 will comprise a circular list. It will be appreciated that the series of group next pointers in respective fields 86 of the queues 94(*q*) in the list 94 serves to link the various queues 94(*q*) in the list 94.

The queue header 95 associated with the queue 94(*q*) also includes the cell read pointer 72 from the connection information entry 52(*c*) of the connection table 52 for the connection associated with the queue 94(q). As described above, the cells CELL(i) associated with each connection are organized in a queue so that the switching node 11(*n*) will transmit the cells CELL(i) for the connection in the order in which they are received. The queue 94(*q*) maintains the cells CELL(i) for the connection in a series of cell queue entries 94(q)(0) through 94(q)(E) (generally identified by reference numeral 94(q)(e)), with each queue entry including a next cell pointer 80 from the cell pointer table 53 (FIG. 6) and a cell field 96. For each cell queue entry 94(q)(e), the cell field 96 represents the storage location in storage section 34 (FIG. 5) which contains the actual cell CELL(i) for the cell queue entry 94(q)(e), and the next cell pointer 80 points to the next cell queue entry 94(q)(e+1) in the queue 94(q).

The next cell pointer 80 of the last cell queue entry 94(q)(E) may contain a null value or other value which indicates that it is the last queue entry 60(q)(E) in the queue 94(q). It will be appreciated that the number of cell queue entries 94(q)(e) in a queue 94(*q*) may fluctuate based on the rate at which cells CELL(i) associated with the connection associated with the queue 94(*q*) are received and transmitted by the output port module 31(*p*). In addition, the various queues 94(*q*) may contain different numbers of cell queue entries 94(q)(e). The cell read pointer 72 in the header 95, in turn, points to the first cell queue entry 94(q)(0) in the queue. It will be appreciated that, since the cell queue entries 94(q)(e) in the queue 94(*q*) associated with a particular connection are in order in which their respective cells CELL(i) will be transmitted, the cell read pointer 72 of the queue's header 95 will always point to the cell queue entry 94(q)(0) containing the next cell to be transmitted for the connection. The queue header 95 also includes the cell write pointer field 73 which identifies the last cell queue entry 94(q)(E) in the queue 94(q), to be used to add a cell queue entry 94(q)(e) when a cell CELL(i) has been received for the connection associated with the queue 94(q).

As noted above, the queue header 95 also contains cell transmission status information for the connection that is associated with the queue 94(q). In particular, the queue header 95 includes the time stamp field 87, which, as noted above, is used the scheduling unit to control the transmission of cells from the queue 94(q). The time stamp field 87 contains a time stamp which, along with the contents of the group time interval field 85 associated with the group 91(*g*) define a time window within which the cell CELL(i) in the first cell queue entry 94(q)(0) is to be transmitted to maintain the guaranteed service rate for the connection associated with the queue 90(q). That is, to maintain the guaranteed service rate, scheduling unit 43 will schedule a queue 94(*q*) to provide a cell CELL(i) for transmission by the time that is identified by the time stamp value in the field 87. However, to ensure, among other things, that cells CELL(i) from entries 94(q)(e) are not transmitted at an unduly high rate, scheduling unit 43 will not schedule a queue 94(*q*) to provide a cell CELL(i) for transmission prior to a transmission eligible time corresponding to the value of the time stamp field minus the group time interval 85 in entry 57(*g*) of the time interval table 57. In addition, after a cell CELL(i) is transmitted from the queue 94(0) at the head of the list 94, the time stamp 87 in entry 55(*n*) will be incremented by an amount corresponding to the group time interval 85 in entry 57(g) of the time interval table 57 associated with the group, so as to define a new window during which group 91(*g*) will be scheduled to provide its next cell CELL(i) for transmission. The queues 94(q) in list 94 associated with group 51(*g*) will be organized in the order in which the associated connections are to be scheduled by the scheduling unit 43, and so it will be appreciated that the time stamps 87 of the respective headers 95 will preferably be increasing for the successive queues 94(0) through 91(Q) in a group 91(g), and the difference between the time stamps 87 of the head and tail queues 94(0) and 91(Q) will be less than or equal to the group time interval 85.

Grouping queues 94(*q*) for the various connections into groups 91(*g*) as described above provides an efficient arrangement for regulating the transmission of cells CELL(i) associated with the various connections circuits for which the service rate of transmission is to be regulated. For other connections, including both connections not associated with a service rate and connections for which the maximum rate of transmission is not to be regulated, an unregulated group 92 is provided which may be used to identify connections from which cells CELL(i) which are to be transmitted if none of the groups 91(*g*) are eligible. The unregulated group 92 provides a mechanism by which excess information transmission bandwidth over the communication links 13(1), which would not otherwise be used because none of the groups 91(*g*) have queues 94(*q*) in an eligible condition, can be used. In one embodiment, the unregulated group 92 is in the form of a multiple-level bit map 97, which will be described in connection with FIG. 9. With reference to FIG. bit map 97 includes (i)) a series of upper level bits 97(0)(1) through 97(0)(K) (generally identified by reference numeral 97(0)(k), (ii) a series of intermediate level bits 97(1)(1) through 97(1)(IK) (generally identified by reference numeral 97(1)(ik)), and (iii)) a series of lower level bits 97(2)(1) through 97(2)(IKL) (where "K," "I" and "L" are integers) ((generally identified by reference numeral 97(2)(ikl), where "i," "k" and "l" are integers".

Each of the lower level bits 97(2)(ikl) is associated with one of the possible connections which may be serviced by the output port module 31(*p*). If a connection is to share in the excess information transmission bandwidth, the bit in the digital word 97(2)(ikl) that is associated with the connection is set to a selected value, and otherwise the bit is clear. A connection's bit 97(2)(ikl) will generally be set if the connection is one which is not associated with a guaranteed service rate, or if the connection does have a guaranteed service rate and the connection is also to share in the excess bandwidth. As with connections associated with the groups 91(g), each connection which is associated only with the unregulated group 92 will also have a connection information entry 52(c) in the connection table, and a queue defined by the entry 52(*c*) and next cell pointers 80 in the cell pointer table 53. However, the entry 52(*c*) for a queue which is only in the unregulated group 92 need not be linked with other entries 52(*c*) by means of group next pointers 86 in the group next table 54.

The intermediate and upper level bits 97(1)(ik) and 97(0)(k) are used to reduce the time required to identify ones of the lower level bits 97(2)(ikl) that are set. In particular, each intermediate level bit 97(1)(ik) is associated with a series of, for example, "L" lower level bits 97(2)(ikl), with intermediate level bit 97(1)(1) being associated with lower level bits 97(2)(1) through 97(2)(L), intermediate level bit 97(1)(2) being associated with lower level bits 97(2)(L+1) through 97(2)(2L), and so forth. If any of the lower level bits 97(2)(ikl) is set, the associated intermediate level bit 97(1) (ik) is also set. Similarly, each intermediate level bit 97(1) (ik) is associated with an upper level bits 97(0)(k), with a series of, for example, "I" intermediate level bits 97(1)(ik), with upper level bit 97(0)(1) being associated with intermediate level bits 97(1)(1) through 97(2)(I), upper level bit 97(0)(2) being associated with intermediate level bits 97(2) (I+1) through 97(2)(2I), and so forth. If any of the intermediate level bits 97(1)(ik) is set, the associated upper level bit 97(0)(k) is also set.

The unregulated queue 92 also makes use of a set of pointers, including an upper level pointer 98(UT), an intermediate level pointer 98(I) and a lower level pointer 98(L) (generally identified by reference numeral 98). The series of pointers 98(U), 98(I) and 98(L) provides an index which points to the upper level bit 97(0)(k), the intermediate level bit 97(1)(ik) and the lower level bit 97(ikl) associated with the connection which was last selected using the unregulated queue 92. When none of the groups 91(*g*) is eligible for selection, the bit map 97 and pointers 98 can be used to identify a connection for which a cell CELL(i) is to be transmitted. To select the next connection for which a cell CELL(i) is to be transmitted, the lower level pointer 98(L) will initially be incremented to attempt to locate the next bit 97(2)(ikl) which is set. If the lower level pointer 98(L) increments past the value "L" without pointing to a set lower level bit 97(2)(ikl), it will be reset, the intermediate level pointer 98(1) incremented and the intermediate level bit 97(1)(ik) pointed to by the intermediate level pointer 98(I) examined. If that intermediate level bit 97(1)(i+1)k) is set, at least one of the lower level bits 97(2)(i+1)k+1) through 97(2)(i+1)k+L) will be set, in which case the lower level pointer 98(L) will be iteratively incremented until the first set lower level bit is found, which, in turn, will identify the next connection to be selected.

On the other hand, if, when the lower level pointer 98(L) is reset, the intermeidate level pointer 97(I) is determined to point to an intermediate level bit 97(1)(i+1)k) that is clear, none of the lower level bits 97(2)(i+1)k+1) through 97(2) (i+1)k+L) will be set. In that case the intermediate level pointer 98(I) will again be incremented, until it points to an intermediate level bit that is set. If the intermediate level pointer 98(I) points to an intermediate level bit 97(1)ik) that is set, one of the lower level bits 97(2)(ik) through 97(2) (ik+L) will be set, and the lower level pointer 98(L) will be incremented until it points to the first of the lower level bits 97(2)(ik) through 97(2)(ik+L) which is set, which, in turn, is associated with the connection which will be selected to provide a cell CELL(i) for transmission.

However, if the intermediate level pointer 98(I) increments past the value "L" without pointing to a set intermediate level bit 97(1)(ik), it will be reset, the upper level pointer 98(U) incremented and the upper level bit 97(0)(k+1) pointed to by the intermediate level pointer 98(I) examined. If that upper level bit 97(0)(k+1) is set, at least one of the intermediate level bits 97(1)(k+1) through 97(1)(k+I) will be set, in which case the intermediate level pointer 98(I) will be iteratively incremented until the first set lower level bit is found, which, in turn, will identify the next connection to be selected.

On the other hand, if, when the intermediate level pointer 98(I) is reset, the upper level pointer 97(U) is determined to point to an upper level bit 97(0)(k+1) that is clear, none of the intermediate level bits 97(1)(k+1) through 97(1)(k+I) will be set. In that case the upper level pointer 98(U) will again be incremented, until it points to an upper level bit that is set. If the upper level pointer 98(U) points to an upper level bit 97(0)(k) that is set, one of the intermediate level bits 97(1)(k) through 97(1)(k+I) will also be set, and the intermediate level pointer 98(I) will be incremented until it points to the first of the intermediate level bits 97(1)(k) through 97(1)(k+I) which is set, which, in turn, is associated with the connection which will be selected to provide a cell CELL(i) for transmission. If the upper level pointer 97(U) increments past the value "K," which points to the last upper level bit 97(0)(K), without pointing to a set upper level bit, it will be reset and operations continue.

By providing the intermediate and upper level bits 97(1)(ik) and 97(0)(k), it will be appreciated that the time required to identify a connection in the unregulated queue 92 can be reduced, since series of lower and intermediate level bits, respectively associated with the intermediate and upper level bits, need not be examined if the respective upper level bits are not set.

It will be appreciated that, if the cell CELL(i) transmitted based on use of the unregulated group 92 was from queue 94(q) in a group 91(g) used for those connections with guaranteed service rates, the scheduling unit 43 will generally not re-order the list 94 which contains the queue 94(q) as described above in connection with FIG. 8. If the list 94(g) is not re-ordered, when the queue 94(q) reaches the head of the list 94 for its respective group 91(g), the scheduling unit 43 will at some point select the cell CELL(i) in the next cell queue entry 94(q)(1) (that is, the cell queue entry after the one that was selected for transmission by way of the unregulated group 92) for transmission as described above in connection with FIGS. 5 and 6. Accordingly, the queue 94(q) will be selected to provide cells CELL(i) for transmission through two mechanisms, namely, an regulated mechanism provided by groups 91(g), which will ensure at least a minimum service rate, and an unregulated mechanism provided by the unregulated group 92, which will ensure that the queue 94(q) will receive a share in the excess bandwidth.

With reference again to FIGS. 5 through 7, the connection grouping unit 42, in particular the group controller module 45, performs a number of operations, including (A) establishing a new queue 94(q) and, if necessary, a new group 91(g), when a connection is established, and allocating resources (in particular, the various data structures described above in connection with FIG. 6) therefor;

(B) enabling the cell output section 35 to retrieve cells CELL(i) for transmission, based on group selection information provided by the scheduling unit 43 identifying the group whose head queue 94(0) is to provide a cell CELL(i) for transmission, and incrementing the head queue's time stamp and reorganizing the queues 94(q) in the selected group 91(g);

(C) moving one or more queues 94(q) from one group 91(i g) to another group 91(i g') when, for example, the service rate for the queue 94(q) changes or the resources of group 91(g) are needed for a new group; and (D) deleting a queue 94(q) when the queue becomes empty and a group 91(g) when the group becomes empty.

The connection grouping unit 42 includes, in addition to the group controller module 45, a group allocation module 46, and group policing module 47 (FIG. 5) perform a number operations in establishing and maintaining the groups 91(g). When the output port module 31(p) is to service a new connection, or when the service rate for a connection changes, these elements 46 and 47, cooperate with the group controller module 45 to establish a queue 94(q) for the new connection, to determine whether and how a queue 94(q) for a connection whose service rate is to be changed is to be moved from one group 91(g), associated with its old service rate, to a new group 91(g), associated with its new service rate, and to establish new groups 91(g) when necessary to accommodate new service rates. In particular, the group policing module 47, in cooperation with the group controller module 45, ensures that the number of distinct service rates (corresponding to the number of entries 52(n) in the group information table 52) does not exceed a predetermined limit, and whether groups with similar, but not necessarily identical, service rates are to be grouped together. In addition, the group allocation module 43 assists the group controller 41 in allocating new groups 91(g) and new queues 94(q) within each group, by maintaining the various entries 56(g) in the group table 56.

With respect to establishment of a new queue 94(q) and, if necessary, a new group 91(g) (item (A) above), the group controller 45 may operate in response to control cells which are transmitted over the network 10 to control the establishment of paths for transmission of packets 20 (FIG. 2) between source and destination computer systems 12($m_s$) and 12($m_D$). In that operation, the group controller 45 will establish and initialize a connection information entry 52(c) in the connection table 52 for the new connection and provide an initial time stamp 87 in the entry 55(n) of the time stamp table 55 associated with that connection information entry 52(c). The group controller module 45 can provide an initial time stamp when the first cell CELL(i) is received for the connection as the time, as indicated by the clock 93, at which the cell is received, which value may be modified as described below. If the new connection has an associated guaranteed service rate that corresponds to a service rate associated with one of the groups 91(g) defined by an entry 56(g) of the group table 56, the group controller module 45 can associate the newly-created queue 94($q_n$) to the list 94 for the group 91(g) which provides the required guaranteed service rate, and actually link it into the group when a cell CELL(i) is received for the connection. On the other hand, if the new connection requires a guaranteed service rate that does not correspond to a service rate provided by any of the existing groups 91(g), the group controller module 45 can establish a new group, including the new queue 94($q_n$), and in the process establish a new entry 56(g) in the group table 56 for the new group, using resources provided by the group allocation module 46 and group policing module 47.

As noted above, the association of the queue 94(q) for each connection, to a particular group 91(g), will generally be based on the guaranteed service rates which are associated with the connection. The output port module 31(p) may provide a new group 91(g) for each different guaranteed service rate for which the connections being handled thereby. However, it will be appreciated that that would require a separate entry 56(g) in the group table 56 and a corresponding entry 57(g) in the time interval table 57 for each different guaranteed service rate. In one particular embodiment, the number of entries 56(g) and 57 in the group table 56 and time interval table 57 is limited. In that embodiment, if the group table 56 and time interval table 57 are full, and if the output port module 31(p) is to service a new connection requiring another guaranteed service rate which does not correspond to a rate associated with any entry 52(n) in the table 52, the group controller module 45 can, in conjunction with the group policing unit 44, accommodate the new connection by preferably associating the new connection with a group 91(g) which has a service rate which is the closest to, but is not less than, the required service rate for the new connection.

When the group controller module 45 associates the new connection with a group 91(g) which has a service rate which is the closest to, but preferably not less than, the required service rate for the new connection (item (i) above), it would preferably link the queue 94(q) for the new connection into the list 94 for the group 91(g) at a location in the sequence of queues 94(q) in the list 94 to ensure that the successive queues 94(q) are associated with successively higher time stamps. For a newly set-up connection which has no time stamp 87, the group controller module 45 will provide the queue 94(q) associated with the connection with an initial time stamp corresponding to the sum of the time stamps 87 of the head and tail queues 94(0) and 94(0) and the group's time interval 85, divided by two. To preserve the time stamp ordering of the successive queues 94(q) in the group, either when inserting a queue 94(q) for a new connection or when re-inserting a queue 94(q) for a connection which was previously removed from the group 91(g) because its cell counter 70 had decremented to zero, preferably the group controller module 45 would step through the queues 94(q) in the list 94 for the group 91(g) into which the new 94(q) is to be linked to identify the particular point in the list 94 into which the new list 94(q) should be linked to maintain the respective time stamps in the sequential ordering. Alternatively, the group controller module 45 may approximate this ordering by, for example, (i) inserting the queue 94(q) to the head of the list 94 if its time stamp 87 is less then or equal to that of the time stamp of the head queue 94(0), and adjusting the time stamp associated with the queue 94(q) to correspond to the maximum of (a) its time stamp 87 or (b) the time stamp of the tail queue 94(Q) minus the group's service rate in field 56, (ii) inserting the queue 94(q) into the tail of the list 94 if its time stamp 87 is greater than or equal to that of the time stamp of the tail queue 94(Q), and adjusting the time stamp associated with the queue 94(q) to correspond to the minimum of (a) its time stamp 87 or (b) the time stamp of the head queue 94(Q) plus the group's service rate in field 56, (iii) if the time stamp 87 of the queue 94(q) is closer to the time stamp of the head queue 94(0) than to the time stamp of the tail queue 94(Q), but not less than the time stamp of the head queue 94(0), insert the queue 94(q) into the head of the list 94 and adjusting its time stamp 87 to be equal to the time stamp of the head queue 94(0), or (iv) if the time stamp 87 of the queue 94(q) is closer to the time stamp of the tail queue 94(Q) than to the time stamp of the head queue 94(0), but not larger than the time stamp of the tail queue 94(Q), inserting the queue 94(q) into the tail of the list 94 and adjusting its time stamp 87 to be equal to the time stamp of the tail queue, which will preserve the ordering of time stamps in the list 94. The group controller module 45 may perform similar operations (i) through (iv) when it inserts a previously removed connection into a group 91(g) when a cell CELL(i) is received for that connection.

With respect to enabling the cell output section 35 to retrieve cells CELL(i) for transmission (item (B) above), when a cell CELL(i) is to be transmitted, if the scheduling unit 43 provides the group controller module 45 with the identification of a head queue 94(0) from a group 91(g) which is to provide a cell CELL(i) for transmission, the group controller module 45 will enable the cell output section 35 to transmit a cell CELL(i) from that head queue 94(0). In addition, the group controller module 45 will:

(i) using the time interval 85 in entry 57(g) of the time interval table 57 that is associated with the group 91(g) from which the cell CELL(i) was transmitted, increment the time stamp 85 of the header 95 of the head queue 94(0) of the selected group, and (ii) reorganize the list 94 in that group 91($_g$) as described above so that the queue 94(0) from which a cell was transmitted will be linked the tail of the list 94.

On the other hand, if the scheduling unit 43 provides the group controller module 45 with the identification of a queue from the unregulated group 92, the group controller unit 45 will just enable the cell output section 35 to transmit a cell CELL(i) from that queue. In updating the time stamp 85 of the header 95 of the queue 94(0) from which a cell CELL(i) is transmitted (item (i) above), the group controller module 45 will make use of the group time interval 85 in entry 57(g) of the time interval table 57 associated with the group 91(g) from which the cell CELL(i) was transmitted. The value of the group time interval 85 provided for each group 91(g) is selected to ensure that the time period between transmissions of cells CELL(i) from the queues 94(q) associated with the various connections for each group 91(g) will satisfy the required guaranteed or minimum service rate.

As noted above, the group controller module 45 also will move a queue 94(q) from one group 91(g) to another group 91(g') when, for example, the service rate for the queue 94(q) changes or when resources of the group 91(g) are needed for a new group (item (C) above). In that operation, the group controller module 45 can link the queue or queues from group 91(g) into the other group 91(g') in a manner similar to that described above in connection with item (A), above.

In addition, the group controller module 45 will also delete a queue 94(q) when the queue becomes empty and a group 91(g) when the group becomes empty (item (D) above). The group controller module 45 can determine when a queue 94(q) becomes empty and is to be deleted when the cell counter 70 of the connection information entry 52(c) for the connection associated with the queue has a zero value. If a queue 94(q) is to be deleted, the group next pointers 86 will be adjusted to reflect the deletion of the queue 94. Since this is likely to occur when the queue 94(q) is a head queue that has just provided a cell CELL(i) for transmission, the group controller module 45, when it reorganizes the list 94, need merely identify a new head queue and not link the queue to be deleted as the tail queue 94(Q) of the group 91(g).

In deleting a group 91(g), the group controller module 45 will reset the valid flag 82 of the entry 56(g) associated with the group 91(g).

Figure 10:
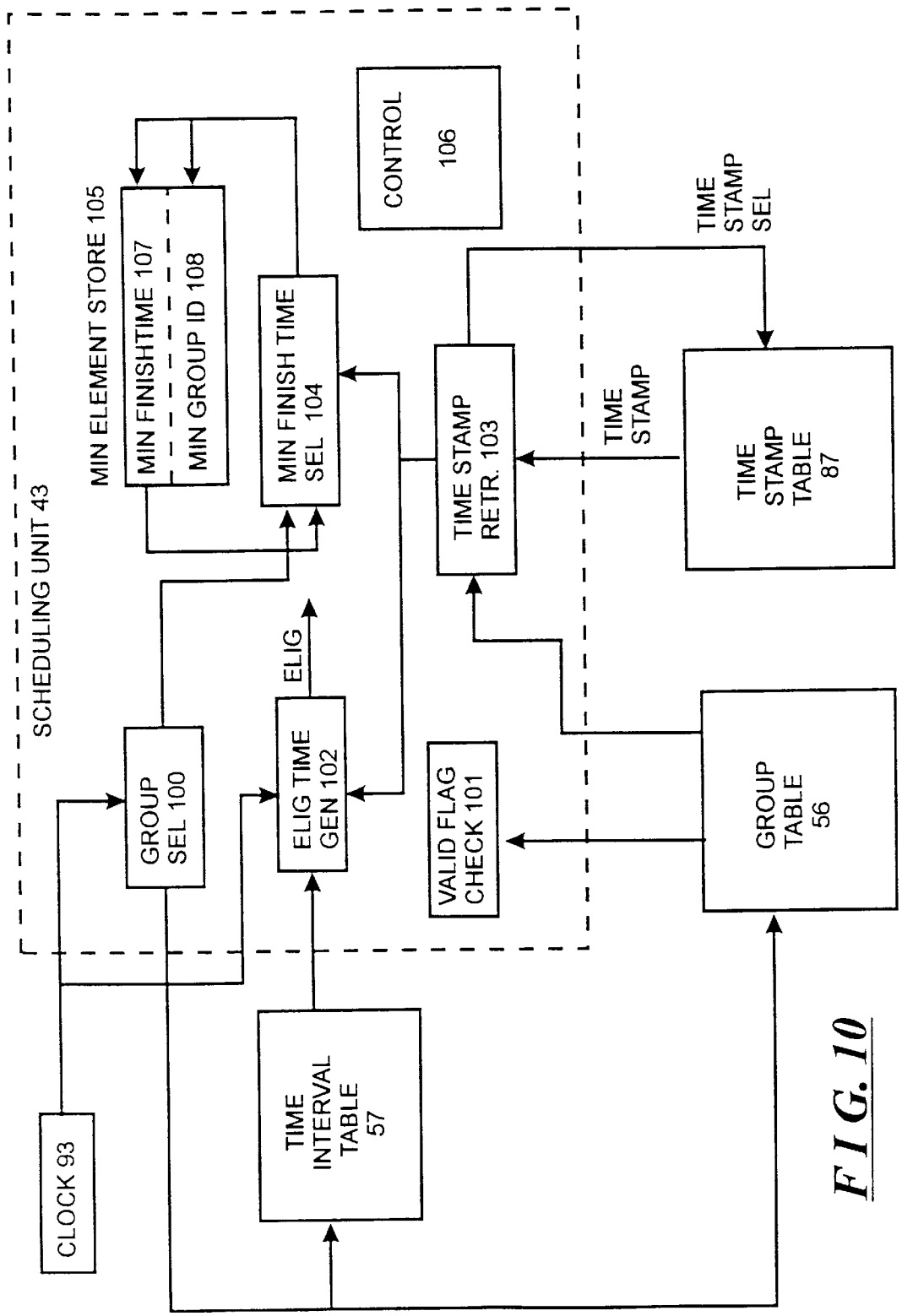
FIG. 10 depicts a functional block diagram of a scheduling unit useful in the output port module depicted in FIG. 6.

As noted above, the scheduling unit 43 schedules the various groups 91(g) and 92 for transmission. FIG. 10 depicts a functional block diagram of the scheduling unit 43. Generally, when the scheduling unit 43 is to select a group 91(g) to provide a cell CELL(i) for transmission, it initially determines whether the group is eligible. As described above, in determining whether a group is eligible, the scheduling unit 43 makes use of the time stamps 87 of the head queues 94(0) of the various groups, and may also make use of the group time intervals 85 of the various groups 91(g). The scheduling unit 43 selects among the various groups 91(g) for transmission based on the particular values of the time stamps 87 of the respective head queues 94(q) for the groups 91(g), and the group time intervals 85 associated with the respective groups 91(g). For each group 91(g), the head queue's time stamp 87 and the group time interval 85 define a time window beginning with an eligibility start time before which the group 91(g)'s head queue 94(0) will not be selected, and a finish time by which the group's head queue should be selected in order to provide the required transmission rate. If the time stamp 87 is taken as the finish time, the eligibility start time will be determined by the time stamp 87 decremented by the group time interval 85; on the other hand, if the time stamp 87 is taken as the eligibility start time, the finish time will be determined by the time stamp 87 incremented by the group time interval 85. For those groups, if any, which are eligible for transmission, the scheduling unit 43 will select the group 91(n) whose head queue 94(0) has the time stamp 85 defines the lowest finish time to provide the cell CELL(i) in the first queue entry 94(0)(0) in that queue 94(0) for transmission over the appropriate communication link 13(1). If the scheduling unit 43 determines that none of the groups 91(g) are eligible, a connection to be scheduled for transmission will be selected from the unregulated group 92.

With reference to FIG. 9, the scheduling unit 43 includes a group selector module 100, a valid flag check module 101, an eligible time generator 102, a time stamp retrieval module 103, a minimum element selector 104, and a minimum element store 105 all under control of a control module 106. Generally, the scheduling unit 43 operates in a series of iterations, each associated with one of the groups 91(g), to retrieve the time stamp 87 from the head queue 94(0) in the queue, determine whether the time stamp indicates that the queue 94(0) is eligible, and if so determine whether its time stamp is the minimum of the previously-retrieved time stamps. If so, the scheduling unit 43 stores that time stamp as a new minimum, along with an identifier for that head queue 94(0), and will sequence to the next iteration. After performing these operations in connection with all of the groups 91(g), the head group identifier stored by the scheduling unit 43 will identify the head queue 94(0) among all of the groups which are eligible which has the minimum time stamp, which head queue 94(0), in turn, will supply a cell CELL(i) for transmission.

More specifically, when the scheduling unit 43 is to select a group 91(g) to identify a group 91(g) whose head queue 94(0) is to supply cell CELL(i) for transmission, the group selector module 100 generates a GROUP ENTRY SEL group entry select indication which identifies the first entry 56(0) in the group table 56. The valid flag check module 101 will determine whether the valid flag 82 of that entry 56(0) indicates that the entry 56(0) is eligible. If the valid flag check module 101 determines that the valid flag 82 of entry 56(0) is clear, indicating that the entry 56(0) does not identify a valid group 91(g), the group selector module 100 can sequence to the next entry 56(1), generating a GROUP ENTRY SEL group entry select indication which identifies that entry 56(1).

On the other hand, if the valid check flag check module 101 determines that the valid flag check module 101 determines that the valid flag 82 of entry 56(0) is set, the group time interval 85 associated with the group 91(g) will be retrieved from the time interval table 57 and coupled to the eligible time generator module 102. In addition, the time stamp retrieval module 103 will retrieve the time stamp 87 associated with the connection associated with the head queue 94(0) of the group 91(g) that is ed with entry 56(0), and couple the time stamp 87 to the eligible time generator module 102. The eligible time generator module 102, in turn, will generate an eligibility time value from the time stamp 87 provided by the time stamp retrieval module 103 and the group time interval provided by the time interval table, and compare the eligibility time value to the current time as provided by the clock 93. If the eligible time generator module 102 determines that the eligibility time is less than the current time, it will generate an ELIG eligible indication, indicating that the group 91(g) associated with entry 56(0) in the group table 56 is eligible.

The time stamp 87 retrieved by the time stamp retrieval module 103 is also coupled to the minimum element selection module 104. The minimum element selection module 104 also receives a previous minimum time stamp value from an entry 107 of the minimum element store 105, which corresponds to a previous minimum time stamp. Generally, the minimum element selection module 104 compares the previous minimum time stamp value in entry 107 to the retrieved time stamp to determine which has the lower value. However, at this point, the scheduling unit 43 is processing the group 91(g) associated with the first entry 56(0) in the group table 56, and so there is no previous minimum time stamp to be used in the comparison; accordingly, the minimum element selection module 104 can ignore the contents of the entry 107 for this iteration, or, alternatively, the entry 107 can be initialized prior to the first iteration with a relatively high value to ensure that the minimum element selection module 104 will select the first entry 56(0) as having the minimum time stamp value. The minimum element selection module 104 will couple the selected minimum time stamp value for storage in entry 107. In addition, the minimum element selection module 104 will provide an identifier for the group associated with the selected minimum time stamp value for storage in a minimum element identifier entry 108 of the minimum element store 105. Accordingly, if the minimum element selection module 104 determines that the group identified by the GROUP ENTRY SEL group entry selection indication from group selection module 100 has a lower time stamp value than that currently in the entry 107 of minimum element store 105, the minimum element selection module 104 will enable the time stamp 87 provided by time stamp retrieval module 103 and the GROUP ENTRY SEL group entry selection indication from group selection module 100 to be stored in entries 107 and 108, respectively, of the minimum element store 105. On the other hand, if the minimum element selection module 105 determines that the previously-stored minimum time stamp value in entry 107 has the lower time stamp value, it will make no change to the contents of the minimum element store 105.

The scheduling unit 43 will perform these operations through a series of iterations, sequencing through the groups associated with the successive entries 56(g) in the group table 56. At the end of each iteration, the minimum element store 105 will contain the minimum of the time stamps 87 for the head queues 94(0) for the eligible groups associated with entries 56(g) up to and including that iteration, along with the identifier for the entry 56(g) whose head queue had the minimum time stamp. Accordingly, after processing all of the entries 56(g), the minimum element store 105 will contain the minimum of time stamps 87 for all of the groups, if any, which are eligible, and an identifier identify that group. The scheduling unit 43 can provide both the identifier and the time stamp 87 to the group controller module 45 for use in selecting a group 91(g) to provide a cell CELL(i) for transmission.

Figure 11A:
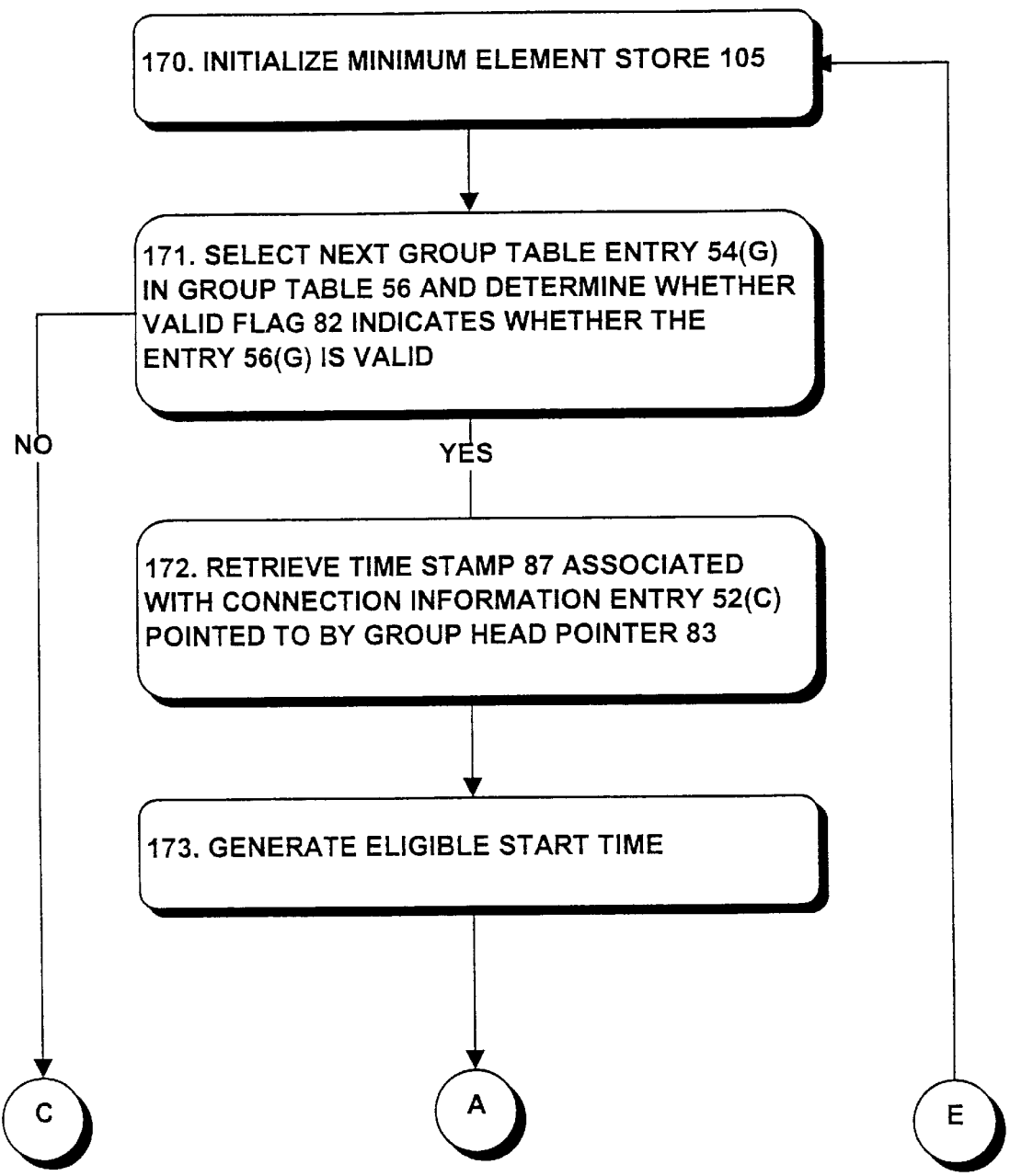
Figure 11B:
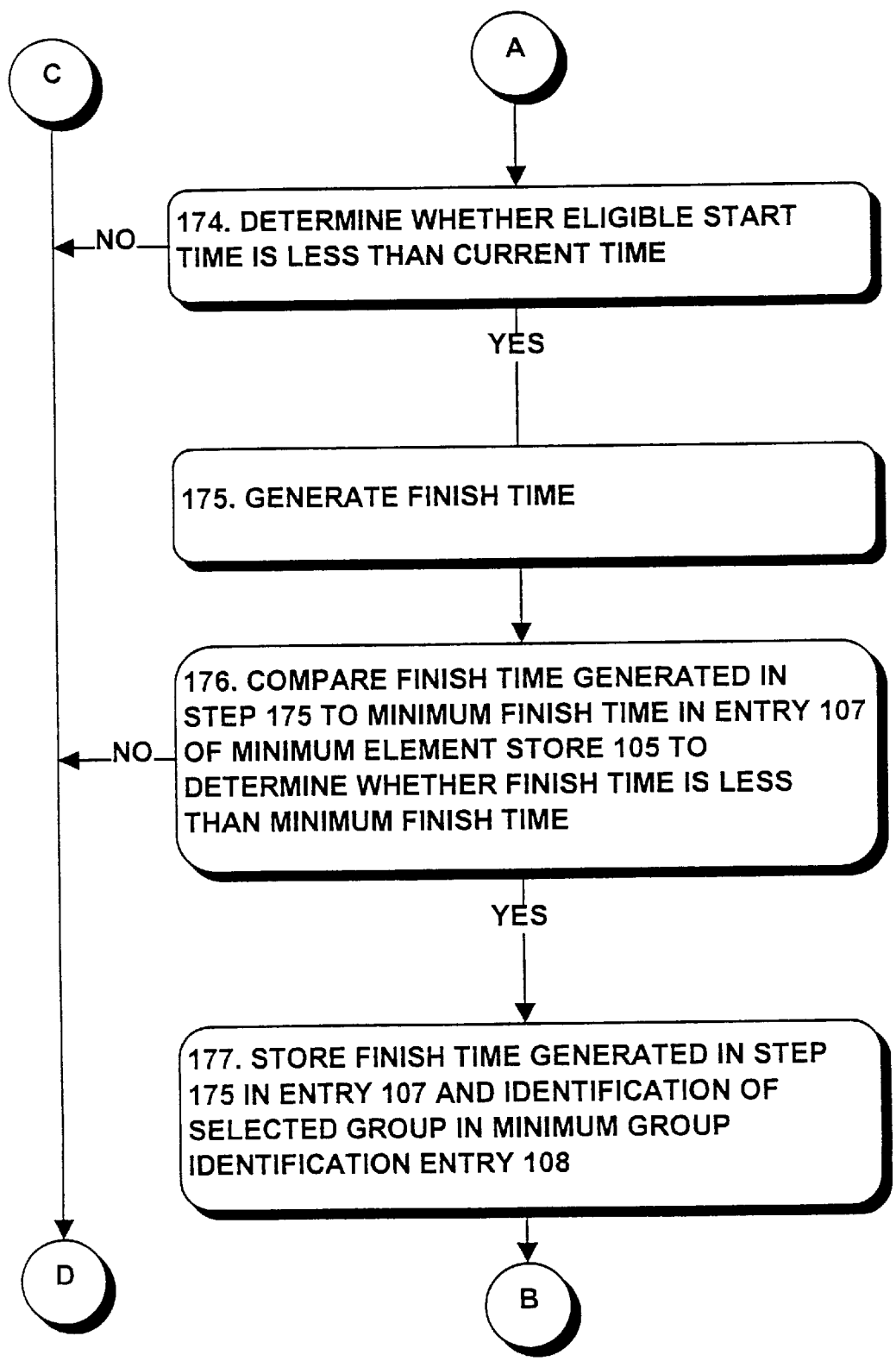

With this background, the sequence of operations performed by the scheduling unit 43 will be described in detail in connection with the flow charts in FIGS. 11A through 11C. With reference to FIG. 11A, generally, the scheduling unit 43 operates in a series of iterations, in each iteration processing one of the group table entries 56(g) in the group table 56. With reference to FIG. 11A, the scheduling unit 43 will, during each iteration, initialize the minimum element store 105 (step 170) and thereafter select the "next" group table entry 56(g) in the group table 56 and determine from the valid flag 82 whether the entry 56(g) is valid (step 171). In the first iteration, it will be appreciated that the "next" group entry 56(g) is the first entry 56(0) in the group table 56. If the entry 56(g) is valid, the scheduling unit 43 will retrieve the time stamp 87 associated with the connection information entry 52(c) that is pointed to by the group head pointer 83 of the selected group table entry 56(g) (step 172), generate an eligible start time (step 173) and determine whether the eligible start time is less than the current time, as provided by clock 93 (step 174). If the scheduling unit 43 determines in step 174 that the eligible finish time is less than the current time, the group is eligible to be selected to provide a cell CELL(i) for transmission. As noted above, if the time stamp 87 corresponds to the eligible start time, the scheduling unit 43 in step 173 will use the time stamp 87 along with the current time to determine whether the group is eligible; on the other hand, if the time stamp 87 corresponds to the finish time, the scheduling unit 43 will decrement the time stamp 87 by the group's group time interval 85 to generate the eligible start time in step 173.

If the scheduling unit 43 determines in step 174 that the group selected in step 171 is eligible, it (that is, the scheduling unit 43) will also use the time stamp 87, and perhaps the group's group time interval 85, to generate a finish time (step 175). As noted above, if the time stamp 87 corresponds to the eligible start time, the scheduling unit 43 in step 175 will increment the time stamp 87 by the group's time interval to generate the finish time; on the other hand, if the time stamp 87 corresponds to the finish time, the scheduling unit 43 will merely use the time stamp as the finish time. After the finish time has been generated in step 175, the scheduling unit 43 will compare the finish time to the minimum finish time value stored in entry 107 of the minimum element store 105 (step 176). If the scheduling unit 43 determines in step 176 that the finish time generated in step 175 is less than the minimum finish time in entry 107 of the minimum element store 105, then it will store the finish time generated in step 175 in entry 107 along with the identification of the selected group 91(g) in entry 108 (step 177).

Returning to
(i) step 176, if the scheduling unit 43 determines in that step that the finish time generated in step 175 is greater than the minimum finish time value stored in entry 107 of the minimum element store,
(ii) step 174, if the scheduling unit 43 determines in that step that the selected group is not eligible, or
(iii) step 171, if the scheduling unit determines in that step that the valid flag 82 of the group table entry 56(g) of the selected group indicates that the entry 56(g) is not valid, it (that is, the scheduling unit 43) will sequence to step 178 to determine whether there are any additional entries 56(g) in the group table. If there are any additional entries 56(g), the scheduling unit 43 will return to step 170 to initiate a new iteration in connection with the next entry 56(g). On the other hand, if there are no additional entries 56(g), the scheduling unit 43 will sequence to step 179 to determine whether the minimum group identifier entry 108 contains a group identifier, and if so, it will provide the group identifier to the group controller module 45 (step 180), which the group control module 45 will use in enabling the cell output section 35 to retrieve a cell CELL(i) for transmission as described above. If, however, the scheduling unit 43 determines in step 179 that the minimum group identifier entry 108 does not contain a group identifier, which may occur if none of the groups 91(g) are eligible, it (that is, the scheduling unit 43) will so notify the group controller module 45 (step 181), and the group controller module 45 will use the unregulated group to select a connection for which a cell CELL(i) will be transmitted.

The invention provides a number of advantages. In particular it provides an arrangement for use in connection with a digital network in which message transfer paths may be provided with a plurality of transfer service rates, for grouping message transfer paths which have similar transfer service rates to facilitate efficient scheduling of transfers thereover.

It will be appreciated that a number of modifications may be made to the arrangement described above in connection with FIGS. 1 through 11. For example, although the grouping and scheduling mechanisms have been described in connection with a network switching node, the mechanisms will also find utility in other points at which cells are queued and scheduling for transmission, including, for example network adapters which are used to interface the various cell generating devices (illustratively represented in FIG. 1 by computer systems 12(m)) to the network 10, queuing points in multi-stage switches, and the like. In addition, the grouping and scheduling mechanisms may be used separately in such arrangements.

In addition, if the switching node does not need to enforce a maximum cell CELL(i) transfer rate for any of the connections it is handling, it may eliminate the unregulated queue 92. In that case, the connections associated with an available service rate would be assigned to and their queues 94(0) may be linked into the respective groups 91(g) based on a service rate which may be assigned by the switching node. In addition, to ensure that the excess bandwidth is used, whenever it is determined that none of the groups are eligible for transmission, the scheduling unit 43 may either schedule groups by (i) integrating the clock 93 by an amount which will ensure that at least one of the groups is eligible for transmission, or (i) eliminating the eligibility determination and selecting the group 91(g) whose time stamp 87 has the lowest value.

Figure 12:
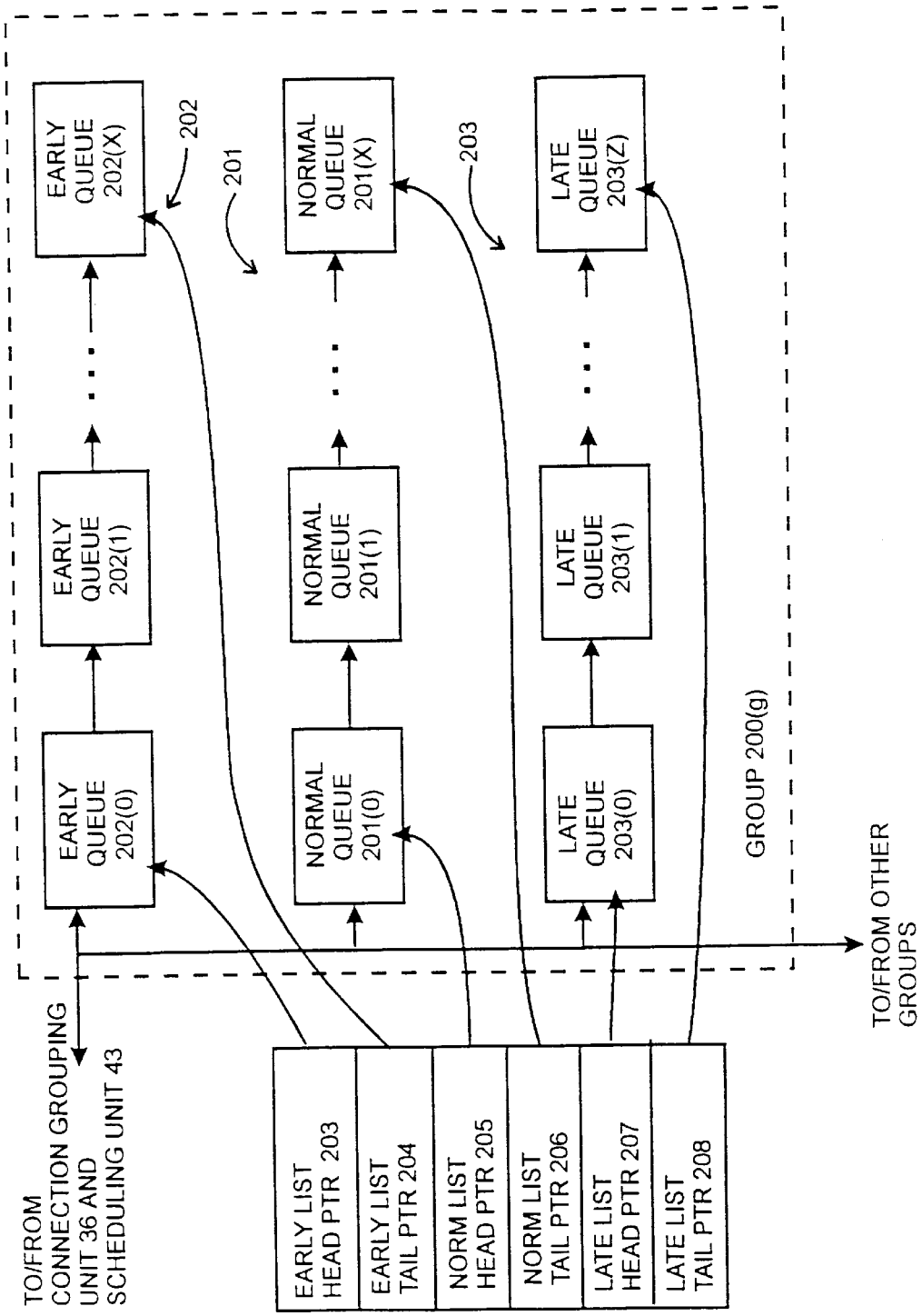
FIG. 12 depicts a second embodiment of a cell transfer control service group and data structures useful therewith.

In addition, while the arrangement efficiently handles transfers for connections whose service rates are relatively static, if service rates may be relatively dynamic, ensuring that the lists 94 of the various groups 91(g) are in proper order may be difficult. For example, if the service rate of a connection in a group 91(g) changes, the queue 94(q) for that connection should be removed from the group and moved to another group 91(g) that is associated with the new service rate, which may be a new group or an existing group. FIG. 12 depicts an arrangement by which these can be handled efficiently.

With reference to FIG. 12, each group, identified in FIG. 12 by reference numeral 200(g), is provided with three lists, including a normal list 201, an early list 202 and a late list 202. The normal list 201 comprises a number of queues 201(0) through 201(X) (generally identified by reference numeral 201(x)) linked in a list in a manner similar to that described above in connection with FIG. 8. Similarly, the early list 202 comprises a number of queues 202(0) through 202(Y) (generally identified by reference numeral 202(y)), and the late list 202 comprises a number of queues 202(0) through 202(Z) (generally identified by reference numeral 202(z)). Each queue 201(x), 202(y) and 202(z) comprises a queue which is similar to the queues 94(q) as described above in connection with FIG. 8. The lists are defined by respective head and tail pointers 203 through 208, which would be provided in a group information table similar to table 52 (FIG. 6), along with a valid flag 82. All of the lists 201 through 203 share the same group time interval 85 which identifies the service rate for all of the connections associated with queues in the group 200(g). The early and late queues 202(y) and 203(z) are linked to the respective early and late lists 202 and 203 based on the respective time stamps 87 of their respective headers 95 (FIG. 8) when they are associated with the group 200(g). In particular, a connection is determined to be early, and thus its queue will be assigned to the early list 202, if the current time, as indicated by clock 93, is greater than the queue's time stamp 87; otherwise, a connection is determined to be late, and thus will be assigned its to the late list 202. All newly-established connections will normally be linked into the early list 202, and the group controller module 45 may link their queues, as well as queues which are to be linked to the late list 203, in a manner similar to that described above (reference item (A) above). As queues 202(y) and 203(z) from the early and late lists 202 and 203 are selected for transmission, they will be linked to the normal list 201.

The scheduling unit 43 will use all of the lists 201 through 202 in determining whether the group 200(g) is eligible for transmission and whether the group 200(g) is to be selected for transmission, in a manner similar to that described above in connection with FIGS. 6 through 10. That is, the scheduling unit 43 will independently process the head queues 201(0), 202(0) and 203(0) in each of the lists 201, 202 and 203 as though they were separate groups, to determine eligibility for each of the lists, and also to select a connection for which a cell CELL(i) is to be transmitted. However, when the head queue 202(0) or 203(0) from the early or late list 202 or 203 is selected for transmission, the group controller module 45, when it reorganizes the group 200, will link the head queue to the tail of the normal list 201, and increment the queue's time stamp 87 by the group time interval. Thus, the normal list 201 will always remain well sorted.

The multiple list arrangement described above in connection with FIG. 12 may also be used in connection with re-inserting a connection's queue 94(q) into a group when a new cell CELL(i) was received after the queue was removed from the group when its cell counter decremented to zero. In that operation, the connection's queue 94(q) can be inserted into the appropriate early or late list 202 or 203 based on the queue's time stamp 87.

Other modifications will also be apparent. For example, while, while the arrangement has been described in connection with a network which uses the ATM message transfer methodology, it will be appreciated that the arrangement may find utility in connection with networks which use other methodologies, for which a variety of service rates may be provided. In addition, while the arrangement has been described in connection with grouping of connections and queuing of fixed-length cells CELL(i) defined according to the ATM message transfer methodology, it will be appreciated that the arrangement may also find utility in connection with any methodology for transferring information used in any of a number of types of networks.

In addition, while the scheduling unit 43 has been described as selecting, among eligible connecitons, the connection with the lowest time stamp 87, it will be appreciated that the scheduling unit may also use other or additional criteria in making the selection. For example, the scheduling unit may alternatingly select among connections which have even- and odd-valued time stamps 87, among groups with even- and odd-valued or high- and low-valued group time intervals 85, or the like. In addition, the scheduling unit 43 may select among groups or connections selected by other scheduling units, which may, but need not, be similar to scheduling unit 43 or use similar criteria in making a selection.

It will also be appreciated that arrangements in accordance with the invention can be constructed in whole or in part from special purpose hardware or a general purpose microprocessor, or any combination thereof, any portion of which may be controlled by a suitable program.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by letters patent of the united states is:

1. A queue control system for use in connection with transfer of information transfer units, in a digital network, the network providing a plurality of service rates, the queue control subsystem comprising:

A. an information transfer unit receiver for receiving information transfer units, B. a buffer for buffering information transfer units received by said information transfer unit receiver, and C. a group controller for controlling the buffering of information transfer units in said buffer, the group controller aggregating the information transfer units in the buffer into a plurality of groups each associated with a respective one of said service rates, with all of the information transfer units associated with one of said service rates being aggregated into the same one of said plurality of groups.

2. The queue control system as defined in claim 1 in which each information transfer unit comprises a cell.

3. The queue control system as defined in claim 2 in which all of said cells have a predetermined length.

4. The queue control system as defined in claim 1 in which each said information transfer unit is associated with a path identifier identifying a path through said network, each path having an associated one of said plurality of service rates, the group controller aggregating the information transfer units in said buffer in groups according to their associated path identifiers, and further according to their respective service rates.

5. The queue control system as defined in claim 4 in which said group controller aggregates information transfer units associated with a path identifier in a path queue in said buffer associated with said path identifier.

6. The queue control system as defined in claim 5 in which said path queue has a path queue tail member, and in which said group controller, in response to receipt of one of said information transfer units adds the information transfer unit to the path queue for the path queue associated with the information transfer unit's associated path identifier, as the path queue tail member.

7. A queue control system for use in connection with transfer of information transfer units, in a digital network, the network providing a plurality of service rates, each said information transfer unit being associated with a path identifier identifying a path through said network, the queue control subsystem comprising:

A. an information transfer unit receiver for receiving information transfer units, B. a buffer for buffering information transfer units received by said information transfer unit receiver, C. a group controller for controlling the buffering of information transfer units in said buffer, the group controller aggregating the information transfer units in the buffer into a plurality of groups each associated with a respective one of said service rates, the group controller aggregating the information transfer units in said buffer in groups according to their associated path identifiers in a path queue in said buffer associated with said path identifier, and D. a resource allocator responsive to receipt by said information buffer control subsystem of one of said information transfer units associated with a new path identifier for providing the group controller with one of said path queues for said information transfer unit.

8. The queue control system as defined in claim 7 in which said resource allocator maintains a free list comprising a plurality of free queue entries, the resource allocator providing said group controller with one of said free queue entries in response to receipt by said information buffer control subsystem of said information transfer unit associated with said new path identifier, the group controller using the free queue entry to establish said path queue for said new path identifier.

9. The queue control system as defined in claim 8 in which
   A. the group controller, in response to its determining that said path queue does not contain any information transfer units, provides the path queue to said resource allocator, and
   B. the resource allocator, in response to receiving one of said path queues from the group controller, loads the path queue as one of said free queue entries into its free list.

10. The queue control system as defined in claim 9 in which said group controller aggregates path queues into at least one of said groups associated with one of said service rates.

11. The queue control system as defined in claim 10 in which at least one of said groups comprises a group list.

12. The queue control system as defined in claim 11 in which said resource allocator maintains a free group list comprising a plurality of free group entries, the resource allocator providing said group controller with a free group entry from said plurality of free group entries in response to receipt by said information buffer control subsystem of said information transfer unit associated with a path identifier having a new service rate, the group controller using said free group entry to establish a new group for said new service rate.

13. The queue control system as defined in claim 12 in which
   A. the group controller, in response to its determining that one of said groups does not contain any path queues, provides the group entry for said group to said resource allocator, and
   B. the resource allocator loads the group entry provided thereto by the group controller as a free group entry into its free group list.

14. A queue control system for use in connection with transfer of information transfer units, in a digital network, the network providing a plurality of service rates, each information transfer unit being associated with a path identifier identifying a path through said network, and each path being associated with a service rate, the queue control subsystem comprising:

A. an information transfer unit receiver for receiving information transfer units, B. a buffer for buffering information transfer units received by said information transfer unit receiver, and C. a group controller for controlling the buffering of information transfer units in said buffer, the group controller aggregating the information transfer units in the buffer into a plurality of groups each associated with a respective one of said service rates, said group controller maintaining a group associated with each service rate for the paths for which information buffer control subsystem is receiving information transfer units, each group comprising a list of path queues each associated with a path and including information transfer units received by said information transfer unit receiver associated with said path.

15. The queue control system as defined in claim 14 in which each path queue has an associated service time stamp, the group controller maintaining said list of path queues in an order defined by said time stamp.

16. The queue control system as defined in claim 15 in which said group controller further includes a transmission selector for selecting information transfer units for transmission, the transmission selector selecting one of said path queues in said group based on the path queue's respective time stamp.

17. The queue control system as defined in claim 16 in which each said list has a head path queue comprising one of the path queues in the respective list, and which said transmission selector comprises:

A. a group selector for identifying one of said groups as a selected group in response to the time stamp of the groups' respective head path queues, B. an information transfer unit selector for selecting one of said information transfer units from the head path queue of the selected group for transmission.

18. The queue control system as defined in claim 17 in which said group selector selects as the selected group the one of said groups for which the time stamp of the group's respective head path queues has the lowest value.

19. The queue control system as defined in claim 18 in which said transmission selector further includes an eligibility determination element for identifying from among said groups a set of eligible groups in response to the time stamp of the groups' respective head path queues, the group selector identifying said selected group from among said eligible groups.

20. The queue control system as defined in claim 19 further comprising a clock for providing a current time value, the eligibility determination element using the current time value, the time stamps associated with the respective groups' head path queues and the respective groups' service rates in identifying said set of eligible groups.

21. The queue control system as defined in claim 20 in which the eligibility determination element, in determining whether said group is one of said eligible groups, decrements the time stamp associated with the group's head path queue by an amount corresponding to the group's service rate to generate an eligible time value, and determines whether the group is eligible in response to a comparison of the eligible time value to said current time value.

22. The queue control system as defined in claim 21 in which the eligibility determination element determines that said group is one of said eligible groups if the group's eligible time value is less than said current time value.

23. The queue control system as defined in claim 22 in which, if the eligibility determination element determines that no group is a said eligible group, increments the clock so that at least one group is a said eligible group.

24. The queue control system as defined in claim 19 for use in said network including an unregulated service rate, which said group controller further establishing an unregulated group for paths associated with the unregulated service rate, the transmission selector selecting one of said information transfer units for transmission from said unregulated group if the eligibility determination element determines that no group is a said eligible group.

25. The queue control system as defined in claim 24 in which each path includes a path identifier having one of a plurality of path identifier values, and in which said unregulated group is in the form of a bit map comprising a plurality of bits, each associated with one of said path identifier values, each bit having a path present value and a path not present value, the group controller conditioning the bit for the path associated with the path identifier value if the path is associated with the unregulated group.

26. The queue control system as defined in claim 25 in which said unregulated group further includes an upper level bit map comprising a plurality of upper level bits, each upper level bit being associated with a plurality of said bits of said bit map, the group controller further conditioning the upper level bit associated with the bit of the bit map if the path is associated with the unregulated group.

27. The queue control system as defined in claim 17 in which each said list further includes a tail path queue, and said transmission selector further includes a group list reorder element for reorders the list associated with the selected group so that the path queue comprising the head path queue will be linked to the list as the tail path queue.

28. The queue control system as defined in claim 27 in which the group list reorder element further increments the time stamp of the head path queue by an amount corresponding to the selected group's service rate prior while reordering the list associated with the selected group.

29. The queue control system as defined in claim 28 in which said group list reorder element, prior to reordering, further determines whether the head path queue is empty and if so eliminates it from the associated group.

30. The queue control system as defined in claim 15 in which each said list comprises a first list, at least one group further including a second list, the group controller connecting path queues for paths newly associated with the group's service rate to said second list.

31. The queue control system as defined in claim 30, further including a transmission selector for selecting information transfer units for transmission, the transmission selector selecting one of said path queues in a said group based on the respective time stamps, the transmission selector comprising:
   A. a group selector for identifying one of said groups as a selected group in response to the time stamp of the group's respective head path queues of each of said lists,
   B. an information transfer unit selector for selecting an information transfer unit from the head path queue of the selected group for transmission.

32. The queue control system as defined in claim 31 in which said transmission selector selects as the selected group the one of said groups for which the time stamp of the groups' respective head path queues for each of said group's lists has the lowest value.

33. The queue control system as defined in claim 32 in which said transmission selector further includes an eligibility determination element for identifying from among said groups a set of eligible groups in response to the time stamp of the groups' respective head path queues for each of said group's lists, the group selector identifying said selected group from among said eligible groups.

34. The queue control system as defined in claim 33 further comprising a clock for providing a current time value, the eligibility determination element using the current time value, the time stamps associated with the respective groups' head path queues of each of the group's lists and the respective groups' service rates in identifying said set of eligible groups.

35. The queue control system as defined in claim 34 in which the eligibility determination element, in determining whether one of said groups is one of said eligible groups, decrements the time stamp associated with the group's head path queue by an amount corresponding to the group's service rate to generate an eligible time value, and determines whether the group is eligible in response to a comparison of the eligible time value to said current time value.

36. The queue control system as defined in claim 31 in which each said group's first list further includes a tail path queue, and said transmission selector further includes a group list reorder element for reordering the lists associated with the selected group so that the path queue comprising the head path queue of the second list will be linked to the list as the tail path queue of the first list.

37. The queue control system as defined in claim 30 in which at least one group further includes a third list, the group controller connecting path queues for paths newly associated with the group's service rate to one of said second list or said third list based on the path queue's respective time stamp.

38. The queue control system as defined in claim 37 further comprising a clock for generating a current time value, and in which the second list corresponds to an early list and said third list corresponds to a late list, the group controller connecting path queues for paths newly associated with the group's service rate to said early list if the path's associated time stamp is greater than said current time value, and otherwise to the late list.

39. A transmission scheduler for use in transferring information, in the form of information transfer units, in a digital network, the network providing a plurality of service rates, each information transfer unit being associated with a path identifier identifying a path through said network, each path being associated with a service rate and a time stamp, the transmission scheduler comprising:
   A. a transmission selector for selecting information transfer units for transmission, the transmission selector selecting said path based on the path queue's respective time stamp and service rate, and
   B. an information transfer unit transmitter for transmitting the information transfer unit provided by the transmission selector.

40. The transmission scheduler as defined in claim 39 in which each information transfer unit comprises a cell.

41. The transmission scheduler as defined in claim 40 in which all of said cells have a predetermined length.

42. A transmission scheduler for use in transferring information, in the form of information transfer units, in a digital network, the network providing a plurality of service rates, each information transfer unit being associated with a path identifier identifying a path through said network, each path being associated with a service rate and a time stamp, information transfer units for paths associated with corresponding service rates being maintained in a group associated with each service rate, each group comprising a list of path queues each associated with a path and including information transfer units received by said information transfer unit receiver associated with said path, the transmission scheduler comprising:

A. a transmission selector for selecting information transfer units for transmission, the transmission selector selecting said path based on the path queue's respective time stamp and service rate, the transmission selector selecting paths for transmission from among said groups, and B. an information transfer unit transmitter for transmitting the information transfer unit provided by the transmission selector.

43. The transmission scheduler as defined in claim 42 in which each said list has a head path queue comprising one of the path queues in the respective list, and which said transmission selector comprises:

A. a group selector for identifying one said groups as a selected group in response to the time stamp of the groups' respective head path queues, B. an information transfer unit selector for selecting an information transfer unit from the head path queue of the selected group for transmission.

44. The transmission scheduler as defined in claim 43 in which said group selector selects as the selected group the one of said groups for which the time stamp of the groups' respective head path queues has the lowest value.

45. The transmission scheduler as defined in claim 44 in which said transmission selector further includes an eligibility determination element for identifying from among said groups a set of eligible groups in response to the time stamp of the groups' respective head path queues, the group selector identifying said selected group from among said eligible groups.

46. The transmission scheduler as defined in claim 45 further comprising a clock for providing a current time value, the eligibility determination element using the current time value, the time stamps associated with the respective groups' head path queues and the respective groups' service rates in identifying said set of eligible groups.

47. The transmission scheduler as defined in claim 46 in which the eligibility determination element, in determining whether one of said groups is one of said eligible groups, decrements the time stamp associated with the group's head path queue by an amount corresponding to the group's service rate to generate an eligible time value, and determines whether the group is eligible in response to a comparison of the eligible time value to said current time value.

48. The transmission scheduler as defined in claim 47 in which the eligibility determination element determines that a said group is one of said eligible groups if the group's eligible time value is less than said current time value.

49. The transmission scheduler as defined in claim 47 in which, if the eligibility determination element determines that no group is a said eligible group, increments the clock so that at least one group is a said eligible group.

50. The transmission scheduler as defined in claim 43 for use in the network including an unregulated service rate, which said group controller further establishes an unregulated group for paths associated with the unregulated service rate, the transmission selector selecting said path from said unregulated group for which an information transfer unit is to be transmitted if the eligibility determination element determines that no group is a said eligible group.

51. The transmission scheduler as defined in claim 50 in which each path includes a path identifier having one of a plurality of path identifier values, and in which said unregulated group is in the form of a bit map comprising a plurality of bits, each associated with one of said path identifier values, each bit having a path present value and a path not present value, the transmission scheduler selecting a path if its associated bit has the path present value.

52. The transmission scheduler as defined in claim 50 in which the bits of said bit map define a series of bits, the transmission scheduler testing successive bits of the series to identify a bit having the path present value, the transmission scheduler selecting said path associated with said identified bit.

53. The transmission scheduler as defined in claim 52 in which in which said unregulated group further includes an upper level bit map comprising a series of upper level bits, each upper level bit being associated with a series of bits of said bit map, the upper level bit further being conditioned to the path present value if at least one associated bit of the bit map is conditioned to the path present value, the transmission scheduler, testing the upper level bit associated with a series of bits and skipping testing of the series associated with said upper level bit which has the path not present value.

54. The transmission scheduler as defined in claim 51 in which each said list further includes a tail path queue, and said transmission selector further includes a group list reorder element for reordering the list associated with the selected group so that the path queue comprising the head path queue will be linked to the list as the tail path queue.

55. The transmission scheduler as defined in claim 54 in which the group list reorder element further increments the time stamp of the head path queue by an amount corresponding to the selected group's service rate prior while reordering the list associated with the selected group.

56. The transmission scheduler as defined in claim 39 in which at least one path is provided by another transmission scheduler.

\* \* \* \* \*